(12) United States Patent
Liu

(10) Patent No.: US 12,231,876 B2
(45) Date of Patent: Feb. 18, 2025

(54) METHOD AND APPARATUS FOR SECURITY REALIZATION OF CONNECTIONS OVER HETEROGENEOUS ACCESS NETWORKS

(71) Applicant: Nokia Technologies Oy, Espoo (FI)

(72) Inventor: Jennifer Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 56 days.

(21) Appl. No.: 17/266,295

(22) PCT Filed: Aug. 2, 2019

(86) PCT No.: PCT/FI2019/050573
§ 371 (c)(1),
(2) Date: Feb. 5, 2021

(87) PCT Pub. No.: WO2020/030851
PCT Pub. Date: Feb. 13, 2020

(65) Prior Publication Data
US 2021/0306849 A1  Sep. 30, 2021

Related U.S. Application Data

(60) Provisional application No. 62/716,887, filed on Aug. 9, 2018.

(51) Int. Cl.
*H04W 12/06* (2021.01)
*H04W 8/02* (2009.01)
(Continued)

(52) U.S. Cl.
CPC .......... *H04W 12/037* (2021.01); *H04W 8/02* (2013.01); *H04W 12/06* (2013.01);
(Continued)

(58) Field of Classification Search
CPC ... H04W 12/037; H04W 12/06; H04W 76/11; H04W 12/086; H04W 60/00; H04W 12/60; H04W 8/02; H04W 88/06; H04W 12/02
See application file for complete search history.

(56) References Cited

U.S. PATENT DOCUMENTS

2010/0203888 A1  8/2010  Gunaratnam et al.
2016/0105780 A1  4/2016  Hooker et al.
(Continued)

FOREIGN PATENT DOCUMENTS

CN  107683591 A  2/2018
CN  107925879 A  4/2018
(Continued)

OTHER PUBLICATIONS

Ericsson, "SUCI—Readiness to Protection Schemes Update in Future", 3GPP TSG-SA WG3 Meeting #91, Belgrade, Serbia, Apr. 16, 2018, pp. 1-3, S3-181393, 3GPP (Year: 2018).*
(Continued)

*Primary Examiner* — Khawar Iqbal
(74) *Attorney, Agent, or Firm* — ALSTON & BIRD LLP

(57) ABSTRACT

This application relates to session establishment by user equipment over a plurality of heterogenous access networks. In one aspect, the heterogenous access networks may include 3GPP and non-3GPP access networks (106). The non-3GPP access networks (106) may include one or more non-3GPP trusted access networks (108) or one or non-3GPP, non-trusted access networks (110).

21 Claims, 23 Drawing Sheets

Non-3GPP Access Networks (N3AN)

(51) Int. Cl.
    *H04W 12/037*     (2021.01)
    *H04W 12/086*     (2021.01)
    *H04W 12/60*     (2021.01)
    *H04W 60/00*     (2009.01)
    *H04W 76/11*     (2018.01)
    *H04W 88/06*     (2009.01)

(52) U.S. Cl.
    CPC ......... *H04W 12/086* (2021.01); *H04W 12/60* (2021.01); *H04W 60/00* (2013.01); *H04W 76/11* (2018.02); *H04W 88/06* (2013.01)

(56) References Cited

U.S. PATENT DOCUMENTS

| | | |
|---|---|---|
| 2017/0048702 A1 | 2/2017 | Barrett et al. |
| 2018/0020417 A1 | 1/2018 | Catovic et al. |
| 2018/0027414 A1 | 1/2018 | Li et al. |
| 2018/0220364 A1 | 8/2018 | Li et al. |
| 2019/0021064 A1 | 1/2019 | Ryu et al. |
| 2019/0253885 A1* | 8/2019 | Bykampadi |
| 2019/0364428 A1* | 11/2019 | Torvinen |
| 2020/0068391 A1* | 2/2020 | Liu |
| 2020/0296660 A1* | 9/2020 | Wang .................. H04W 8/20 |
| 2020/0344601 A1* | 10/2020 | Baskaran ............. H04W 12/02 |
| 2020/0359195 A1* | 11/2020 | Nakarmi .................. H04W 8/18 |
| 2021/0092603 A1* | 3/2021 | Yang .................. H04W 12/122 |
| 2021/0153010 A1* | 5/2021 | Torvinen .............. H04W 12/04 |
| 2021/0195409 A1* | 6/2021 | Zhang .................. H04W 12/72 |
| 2021/0314857 A1* | 10/2021 | Wang .................. H04W 12/033 |
| 2021/0368345 A1* | 11/2021 | Nakarmi |
| 2022/0174480 A1* | 6/2022 | Baskaran ............. H04L 63/0428 |
| 2022/0272534 A1* | 8/2022 | Torvinen ................ H04L 9/088 |
| 2023/0164559 A1* | 5/2023 | Yang .................. H04W 12/72 |
| | | 455/411 |

FOREIGN PATENT DOCUMENTS

| | | |
|---|---|---|
| EP | 4093093 A1 | 11/2022 |
| KR | 20060130429 A | 12/2006 |
| KR | 10-2017-0132273 A | 12/2017 |
| KR | 10-2018/0022565 A | 3/2018 |
| KR | 10-2018-0057665 A | 5/2018 |
| WO | WO 2018/008944 A1 | 1/2018 |
| WO | WO 2018/197601 A1 | 11/2018 |
| WO | WO 2018/208949 A1 | 11/2018 |
| WO | WO 2019/098496 A1 | 5/2019 |
| WO | WO 2019/139033 A1 | 7/2019 |

OTHER PUBLICATIONS

BlackBerry UK Ltd., Increment the "Registration Attempt Counter", 3GPP TSG-CT WG1 Meeting #111, C1-183739, (May 21-25, 2018), 5 pages.
LG Electronics, "TS 23.501 P-CR Update to Registration Management", SA WG2 Meeting #120, S2-172411, (Mar. 27-31, 2017), 4 pages.
Nokia et al., "Initial Registration Not Accepted Due to Serving Network Not Authorized", 3GPP TSG-CT WG1 Meeting #112, Change Request 0301, C1-185268, (Aug. 20-24, 2018), 6 pages.
Nokia et al., "Non-3GPP Access to 5GCN Not Allowed", 3GPP TSG-CT WG1 Meeting #111bis, Change Request 0080, C1-184875, (Jul. 9-13, 2018), 3 pages.
Notice of Allowance for Chilean Application No. 2021-000335 dated Sep. 15, 2022, 2 pages.
Office Action for ARIPO Application No. AP/P/2021/012934 dated Oct. 25, 2022, 6 pages.
Office Action for Australian Application No. 2019319095 dated May 20, 2022, 4 pages.
Office Action for Chilean Application No. 202100337 dated Aug. 16, 2022, 18 pages.
Office Action for Chilean Application No. 202100337 dated May 4, 2022, 18 pages.
Office Action for Korean Application No. 10-2021-7004962 dated Oct. 28, 2022, 10 pages.
Office Action for Singapore Application No. 11202100720P dated Nov. 2, 2022, 13 pages.
Partial Supplementary European Search Report for European Application No. 19846960.3 dated Aug. 10, 2022, 22 pages.
Qualcomm Incorporated, "TS 23.501: De-Registration Procedure for the UE", SA WG2 Meeting #S2-122, S2-174449, (Jun. 26-30, 2017), 4 pages.
Office Action for Australian Application No. 2019319095 dated Oct. 27, 2021, 8 pages.
Office Action for Korean Application No. 10-2021-7004763 dated Oct. 28, 2021, 3 pages.
"3rd Generation Partnership Project; Technical Specification Group Services and System Aspects; Procedures for the 5G System; Stage 2 (Release 15)", 3GPP TS 23.502 v15.2.0, (Jun. 2018), 308 pages.
Office Action for Algerian Application No. DZ/P/2021/000051 dated Jan. 20, 2022, 2 pages.
Office Action for Canadian Application No. 3,106,505 dated Feb. 25, 2022, 4 pages.
First Examination Report for Indian Application No. 202127009623 dated Feb. 23, 2022, 10 pages.
"3rd Generation Partnership Project; Technical Specification Group Core Network and Terminals; Non-Access-Stratum (NAS) Protocol for 5G Systems (5GS); Stage 3 (Release 15)", 3GPP TS 24.501 v15.0.0 (Jun. 2018), 338 pages.
"3rd Generation Partnership Project; Technical Specification Group Core Network and Terminals; Numbering, addressing and identification (Release 15)", 3GPP TS 23.003 v15.4.0 (Jun. 2018), 120 pages.
"3rd Generation Partnership Project; Technical Specification Group Radio Access Network; NR; NR and NG-RAN Overall Description; Stage 2 (Release 15)", 3GPP TS 38.300 v2.0.0 (Dec. 2017), 68 pags.
"3rd Generation Partnership Project; Technical Specification Group Services and System Aspects; Architecture Enhancements for Non-3GPP Accesses", 3GPP TS 23.402 v14.2.0 (Dec. 2016), 307 pages.
"3rd Generation Partnership Project; Technical Specification Group Services and System Aspects; Policy and Charging Control Framework for the 5G System; Stage 2 (Release 15)", 3GPP TS 23.503 v15.0.0 (Dec. 2017), 56 pages.
"3rd Generation Partnership Project; Technical Specification Group Services and System Aspects; Procedures for the 5G System; Stage 2 (Release 15)", 3GPP TS 23.502 v15.0.0 (Dec. 2017), 258 pages.
"3rd Generation Partnership Project; Technical Specification Group Services and System Aspects; Security architecture and procedures for 5G system (Release 15)", 3GPP TS 33.501 v15.0.0 (Mar. 26, 2018), 128 pages.
"3rd Generation Partnership Project; Technical Specification Group Services and System Aspects; Security Architecture and Procedures for 5G System (Release 15)", 3GPP TS 33.501 v15.1.0 (Jun. 2018), 152 pages.
"3rd Generation Partnership Project; Technical Specification Group Services and System Aspects; System Architecture for the 5G System; Stage 2 (Release 15)", 3GPP TS 23.501 v15.2.0 (Jun. 2018), 217 pages.
"3rd Generation Partnership Project; Technical Specification Group Services and System Aspects; System Architecture for the 5G System; Stage 2 (Release 15)", 3GPP TS 23.501 v15.0.0 (Dec. 2017), 181 pages.
Arkko et al., "Improved Extensible Authentication Protocol Method for 3rd Generation Authentication and Key Agreement (EAP-AKA')", Internet Draft, Network Working Group [online] [Retrieved Apr. 8, 2021]. Retrieved from the Internet: <URL: https://tools.ietf.org/pdf/draft-arkko-eap-rfc5448bis-01.pdf>. (Mar. 5, 2018), 31 pages.
International Search Report and Written Opinion for Patent Cooperation Treaty Application No. PCT/FI2019/050573 dated Oct. 24, 2019, 16 pages.
Kaufman et al., "Internet Engineering Task Force (IETF) Request for Comments: 7296; Internet Key Exchange Protocol Version 2

(56) References Cited

OTHER PUBLICATIONS (IKEv2)", [online] [Retrieved Apr. 8, 2021]. Retrieved from the Internet: <URL: https://tools.ietf.org/pdf/rfc7296.pdf>. (Oct. 2014), 142 pages.
Catt, "Clause 6.1.2—Clarification to Authentication Method Selection-Based on Living CR S3-181465", 3GPP TSG-SA WG3 Meeting #91-bis, S33-181719, Change Request 33.501 CR 0084 Rev 2, (May 21-25, 2018), 3 pages.
MediaTek Inc., "Correction to UE Actions When Receiving 5GMM Cause 11", 3GPP TSG-CT WG1 Meeting #111bis, C1-184504, Change Request 24.501 CR 0211, (Jul. 9-13, 2018), 5 pages.
Notice of Acceptance for Australian Application No. 2019319095 dated Jul. 1, 2022, 3 pages.
Notice of Allowance for Korean Application No. 10-2021-7004763 dated Apr. 28, 2022, 3 pages.
Office Action for Chilean Application No. 202100335 dated May 4, 2022, 10 pages.
Office Action for Chilean Application No. 202100337 dated May 4, 2022, 9 pages.
Office Action for European Application No. 19846960.3 dated Apr. 11, 2022, 3 pages.
Office Action for Japanese Application No. 2021-506706 dated Apr. 11, 2022, 7 pages.
"3rd Generation Partnership Project; Technical Specification Group Core Network and Terminals; Access to the 3GPP 5G Core Network (5GCN) via Non-3GPP Access Networks (N3AN); Stage 3 (Release 16)", 3GPP TS 24.502 V16.3.0, (Mar. 2020), 84 pages.
"3rd Generation Partnership Project; Technical Specification Group Core Network and Terminals; Non-Access-Stratum (NAS) protocol for 5G System (5GS); Stage 3; (Release 16)", 3GPP TS 24.501 v16.4.1, (Mar. 2020), 666 pages.
"3rd Generation Partnership Project; Technical Specification Group Services and System Aspects; System architecture for the 5G System (5GS); Stage 2 (Release 16)", 3GPP TS 23.501 v16.4.0, (Mar. 2020), 430 pages.
China Mobile, "Clarification on Deriving SUPI from SUCI", 3GPP TSG-CT WG4 Meeting #90, CR 0530, C4-191270, (Apr. 8-12, 2019), 4 pages.
Ericsson, "SUPI and SUCI for Wireline Access", SA WG2 Temporary Document, SA WG2 Meeting #131, S2-1902321, (Feb. 25-Mar. 1, 2019), 3 pages.
Extended European Search Report for European Application No. 19846960.3 dated Nov. 10, 2022, 19 pages.
Huawei et al., "Authentication Failure Scenarios", 3GPP TSG CT WG4 Meeting #89, CR 0044, C4-190587, (Feb. 25-Mar. 2, 2019), 7 pages.
Intel, "Clarification on SUCI Scheme-Output Format", 3GPP TSG-CT4 Meeting #91, CR 0532, C4-192184, (May 13-17, 2019), 4 pages.
MediaTek Inc., "SUCI Value IE in Registration Reject Message", 3GPP TSG-CT WG1 Meeting #117, CR 1252, C1-193425, (May 13-17, 2019), 9 pages.
NEC, "Structure of SUPI and SUCI", 3GPP TSG CT WG4 Meeting #85, CR 0504, C4-184201, (May 21-25, 2018), 8 pages.
Office Action for Canadian Application No. 3,106,505 dated Dec. 5, 2022, 5 pages.
Office Action for Japanese Application No. 2021-506706 dated Jan. 30, 2023, 7 pages.
Qualcomm Incorporated, "Stopping T3519 and Deleting SUCI when Receiving Authentication Reject", 3GPP TSG-CT WG1 Meeting #116, CR 1039, C1-192290, (Apr. 8-12, 2019), 4 pages.
Decision to Grant for Japanese Application No. 2021-506706 dated Jun. 22, 2023, 5 pages.
Notice of Allowance for ARIPO Application No. AP/P/2021/012934 dated Nov. 22, 2023, 5 pages.
Notice of Acceptance for Australian Application No. 2022252749 dated Oct. 6, 2023, 3 pages.
Office Action for Canadian Application No. 3,106,505 dated Nov. 21, 2023, 3 pages.
Office Action for Saudi Arabia Application No. 521421213 dated Sep. 20, 2023, 11 pages.
"3rd Generation Partnership Project; Technical Specificaton Group Core Nerwork and Terminals; Non-Access-Stratum (NAS) protocol for 5G System (5GS); Stage 3 (Release 15)", 24.501 v15.1.0, (Sep. 2018), 398 pages.
"3rd Generation Partnership Project; Technical Specification Group Core Nerwork and Terminals; Non-Access-Stratum (NAS) protocol for 5G System (5GS); Stage 3 (Release 15)", 3GPP TS 24.501 v15.7.0, (Jun. 2022), 491 pages.
"3rd Generation Partnership Project; Technical Specification Group Core Nerwork and Terminals; Non-Access-Stratum (NAS) protocol for 5G System (5GS); Stage 3 (Release 15)", 3GPP TS 24.501 v15.3.0, (Mar. 2019), 470 pages.
"3rd Generation Partnership Project; Technical Specification Group Core Nerwork and Terminals; Non-Access-Stratum (NAS) protocol for 5G System (5GS); Stage 3 (Release 15)", 3GPP TS 24.501 v15.2.0, (Dec. 2018), 455 pages.
"3rd Generation Partnership Project; Technical Specificaton Group Core Nerwork and Terminals; Non-Access-Stratum (NAS) protocol for 5G System (5GS); Stage 3 (Release 15)", 3GPP TS 24.501 v15.2.1, (Jan. 2019), 455 pages.
"3rd Generation Partnership Project; Technical Specification Group Core Nerwork and Terminals; Non-Access-Stratum (NAS) protocol for 5G System (5GS); Stage 3 (Release 15)", 3GPP TS 24.501 v15.4.0, (Jun. 2019), 480 pages.
"3rd Generation Partnership Project; Technical Specification Group Core Nerwork and Terminals; Non-Access-Stratum (NAS) protocol for 5G System (5GS); Stage 3 (Release 15)", 3GPP TS 24.501 v15.5.0, (Sep. 2019), 480 pages.
"3rd Generation Partnership Project; Technical Specificaton Group Core Nerwork and Terminals; Non-Access-Stratum (NAS) protocol for 5G System (5GS); Stage 3 (Release 15)", 3GPP TS 24.501 v15.6.0, (Dec. 2019), 478 pages.
"3rd Generation Partnership Project; Technical Specification Group Services and System Aspects; Security architecture and procedures for 5G system (Release 15)", 3GPP TS 33.501 v15.8.0, (Mar. 2020), 191 pages.
"5G; Non-Access-Stratum (NAS) Protocol for 5G System (5GS); Stage 3 (3GPP TS 24.501 bersion 16.5.1 Release 16)", ETSI TS 124 504 v16.5.1, (Aug. 2020), 729 pages.
"5G; System Architecture for the 5G System (5GS) (3GPP TS 23.501 version 16.6.0 Release 16)", ETSI TS 123 501 v16.6.0, (Oct. 2020), 450 pages.
Office Action for Chinese Application No. 201980053388.2 dated Dec. 28, 2023, 20 pages.
Office Action for Colombian Application No. NC2021/0002942 dated Nov. 22, 2023, 16 pages.
"3rd Generation Partnership Project; Technical Specificaton Group Core Network and Terminals; Access to the 3GPP 5G Core Network (5GCN) via Non-3GPP Access Networks (N3AN); Stage 3 (Release 16)", 3GPP TS 24.502 V16.3.0, (Mar. 2020), 84 pages.
"3rd Generation Partnership Project; Technical Specification Group Core Network and Terminals; Numbering, addressing and identification; (Release 16)", 3GPP TS 23.003 V16.2.0, (Mar. 2020), 140 pages.
Notice of Acceptance for Chilean Application No. 2021-000337 dated Mar. 21, 2023, 6 pages.
Office Action for Saudi Arabia Application No. 521421213 dated May 10, 2023.
Notice of Allowance for Korean Application No. 10-2023-7028554 dated Apr. 3, 2024, 5 pages.
Office Action for Indonesian Application No. P00202101642 dated Jan. 10, 2024, 6 pages.
Extended European Search Report for European Application No. 24165791.5 dated Jun. 27, 2024, 13 pages.
Interdigital, "Discussion Paper on the need and ways to make SUPI protection opaque to IMSI sniffers", 3GPP TSG SA WG3 (Security) Meeting #90-Bis, S3-180505, (Feb. 26-Mar. 2, 2018), 9 pages.
CATT, "SUCI structure and SUCI generation conditions", 3GPP TSG SA WG3 (Security) Meeting #90-Bis, S3-180594, (Feb. 26-Mar. 2, 2018), 2 pages.

(56) References Cited

OTHER PUBLICATIONS

Ericsson et al., "Subscription privacy: proposed content to clause 6.8.1 (SUPI) ", 3GPP TSG SA WG3 (Security) Meeting #88, S3-171782, (Aug. 7-11, 2017) 1 page.

* cited by examiner

Architecture of a 5G System over Multiple Access Networks

UE Accessing 4G System over Multiple Access Networks

| Access Network | Service Code | Access Network Type | Network Identifier | Access Network ID (5G:<AN-Type>:<Network Identifier> | NAS Connection Identifier |
|---|---|---|---|---|---|
| 1 | 5G | Access Type A | mnc070mcc310 | 5G:<AccessTypeA>:mnc070mcc310 | 0 |
|  |  |  |  |  |  |

The Serving Network and Access Type to NAS connections Mapping Table after UE Initial registration over Access Type A

FIG. 5

REGISTRATION REQUEST message content

| IEI | Information Element | Type/Reference | Presence | Format | Length |
|---|---|---|---|---|---|
| | ... | | | | |
| | Registration request message identity | Message type 9.7 | M | V | 1 |
| | 5GS registration type | 5GS registration type 9.10.3.7 | M | LV | 2 |
| | ngKSI | NAS key set identifier 9.10.3.29 | M | V | 1/2 |
| | Access Type | Access Type | M | V | 1/2 |
| | 5GS mobile identity | 5GS mobile identity 9.10.3.4 | M | LV | 5-TBD |
| | ... | ... | ... | ... | ... |

FIG. 6

Access type information element

| Access type value (octet 1, bit 1 to bit 2) | | | |
|---|---|---|---|
| Bits | | | |
| 4 | 3 | 2 | 1 | |
| 0 | 0 | 0 | 1 | 3GPP access |
| 0 | 0 | 1 | 0 | untrusted non-3GPP access |
| 0 | 0 | 1 | 1 | trusted non-3GPP access |
| 0 | 1 | 0 | 0 | untrusted WLAN access |
| 0 | 1 | 0 | 1 | trusted WLAN access |
| 0 | 1 | 1 | 0 | MuLteFire access |

All other values are reserved.

FIG. 8

UE initiates registration over new Access Type C – reuse existing NAS security context

The Serving Network and Access Type to NAS connections mapping After subsequent registration over Access Type C

| Access Network | Service Code | Access Network Type | Network Identifier | Access Network ID (5G:<AN-Type>:<Network Identifier> | NAS Connection Identifier |
|---|---|---|---|---|---|
| 1 | 5G | Access Type A | mnc070mcc310 | 5G:<AccessTypeA>:mnc070mcc310 | 0 |
| 2 | 5G | Access Type B | mnc070mcc310 | 5G:<AccessTypeB>:mnc070mcc310 | 1 |
| 3 | 5G | Access Type C | mnc070mcc310 | 5G:<AccessTypeC>:mnc070mcc310 | 2 |
| | | | | | |

FIG. 10

UE initiates registration over new Access Type C – new authentication initiated

The Serving Network and Access Type to NAS connections mapping After subsequent registration over Access Type C

| Access Network | Service Code | Access Network Type | Network Identifier | Access Network ID (5G:<AN-Type>:<Network Identifier> | NAS Connection Identifier |
|---|---|---|---|---|---|
| 1 | 5G | Access Type A | mnc070mcc310 | 5G:<AccessTypeA>:mnc070mcc310 | 0 |
| 2 | 5G | Access Type B | mnc070mcc310 | 5G:<AccessTypeB>:mnc070mcc310 | 1 |
| 3 | 5G | Access Type C | mnc070mcc310 | 5G:<AccessTypeC>:mnc070mcc310 | 2 |

FIG. 12

Serving network authorization failure

```
SUPI format (octet 3, bit 5-7)
Bits
7  6  5
0  0  0    IMSI
0  0  1    IMSI based NAI
0  1  0    Non-IMSI based NAI
0  1  1    MF-NAI All other values are interpreted as IMSI by this version of the protocol.
```

FIG. 16

A new field "SUCI Format"

```
Type of identity (octet 1)
Bits
3  2  1
0  0  1    SUCI
0  1  0    5G-GUTI
0  1  1    IMEI
1  0  0    5G-S-TMSI
1  0  1    IMEISV
1  1  0    MAC
1  1  1    DEVICE_IDENTITY (UDI, ODIN, Bluetooth, serial number,etc)
```

FIG. 17

Subscriber identity type can include MAC address, UDI, ODIN, Bluetooth, serial number:

Generic SUCI subscriber identity format

5GS mobile identity information element for type of identity "SUCI" and SUPI format is "IMSI" or "IMSI based NAI"

5GS mobile identity information element for type of identity "SUCI" and SUPI format is "Non-IMSI based NAI"

5GS mobile identity information element for type of identity "SUCI" and SUPI format is "Non-IMSI based NAI" and NTI is PLMN ID 5GS mobile identity information element for type of identity "SUCI" and SUPI format is "MF-NAI"

SUCI identifier coding

Identity digit (octet 3 bits 5 to 8, octet 4 etc.)

For the IMEI, Identity digit field is coded using BCD coding. If the number of identity digits is even then bits 5 to 8 of the last octet shall be filled with an end mark coded as "1111". The format of the IMEI is described in 3GPP TS 23.003 [4].

For the IMEISV, Identity digit field is coded using BCD coding. Bits 5 to 8 of the last octet shall be filled with an end mark coded as "1111". The format of the IMEISV is described in 3GPP TS 23.003 [4].

For the SUCI, bit 5 of octet 3 is the SUPI format and coded as shown below. Bits 6 to 8 of octet 3 are spare, octet 4 through 6 contain the MCC and MNC values as specified below, and bit 8 of octet 7 is the most significant bit and bit 1 of the last octet the least significant bit for the subsequent fields. The required fields for the SUCI are as defined in 3GPP TS 23.003 [4].

```
SUPI format (octet 3, bit 5-7)
Bit
7  6  5
0  0  0    IMSI
0  0  1    IMSI based NAI
0  1  0    Non-IMSI based NAI
0  1  1    MF-NAI
```

Other values are spare

MCC, Mobile country code (octet 4, octet 5 bits 1 to 4)

The MCC field is coded as in ITU-T Recommendation E.212 [42], annex A.

MNC, Mobile network code (octet 5 bits 5 to 8, octet 6)

The coding of this field is the responsibility of each administration but BCD coding shall be used. The MNC shall consist of 2 or 3 digits. If a network operator decides to use only two digits in the MNC, bits 5 to 8 of octet 5 shall be coded as "1111".

The contents of the MCC and MNC digits are coded as octets 6 to 8 of the Temporary mobile group identity IE in figure 10.5.154 of 3GPP TS 24.008 [12].

Routing indicator (octet 7-8)

Routing Indicator shall consist of 1 to 4 digits. The coding of this field is the responsibility of home network operator but BCD coding shall be used. If a network operator decides to assign less than 4 digits to Routing Indicator, the remaining digits shall be coded as "1111" and inserted at the left side to fill the 4 digits coding of Routing Indicator.

```
Protection scheme identifier (octet 9 bits 1 to 4)
Bits
4 3 2 1
0 0 0 0          Null scheme
0 0 0 1          ECIES scheme profile A
0 0 1 0          ECIES scheme profile B
0 0 1 1
     to          Reserved
1 0 1 1
1 1 0 0
     to          Operator-specific protection scheme
1 1 1 1
```

Home network public key identifier (octet 9 bits 5 to 8, octet 10 to x)

The Home network public key identifier field is coded as defined in 3GPP TS 23.003 [4].

Scheme output (octet x+1 to y)

The Scheme output field is coded as defined in 3GPP TS 23.003 [4].

FIG. 23

METHOD AND APPARATUS FOR SECURITY REALIZATION OF CONNECTIONS OVER HETEROGENEOUS ACCESS NETWORKS

CROSS-REFERENCE TO RELATED APPLICATIONS

The present application is a National Stage Entry of International Patent Application No. PCT/FI2019/050573, filed Aug. 2, 2019, entitled "Method And Apparatus For Security Realization Of Connections Over Heterogeneous Access Networks," which claims priority under 35 U.S.C. § 119 to U.S. Provisional Application No. 62/716,887, entitled, "Method And Apparatus For Security Realization Of Connections Over Heterogeneous Access Networks," filed Aug. 9, 2018, the entire disclosures of each of which are hereby expressly incorporated herein by reference in their entireties for all purposes.

TECHNICAL FIELD

This application relates generally to access networks, and more specifically to session establishment by user equipment over a plurality of heterogeneous access networks

DESCRIPTION OF RELATED ART

The statements in this section provide a description of related art and are not admissions of prior art. User equipment (UE), such as smart phones, smart tablets, laptops, computers, smart watches, etc., often include capability for both wireless local area network (WLAN) connectivity (such as IEEE 802.11x compliant WLAN connectivity) and radio access network connectivity (such as technologies wholly or partially compliant with the 3rd generation partnership project (3GPP) set of standards including EVDO, UMTS, HSPA, and LTE). The UE may thus connect to the 3GPP evolved packet core (EPC) network using two types of access technologies composed of 3GPP access networks and non-3GPP access networks.

In general, 3GPP access networks are wholly or partially compliant with technologies specified by the 3GPP set of standards that include, e.g., GPRS, UMTS, EDGE, HSPA, LTE and LTE Advanced. Non-3GPP access networks are wholly or partially compliant with technologies that are not specified by the 3GPP set of standards. They include technologies such as cdma2000, WLAN (such as IEEE 802.11x compliant WLAN) or fixed networks.

The 3GPP set of standards specifies "non-3GPP" access technologies with different security mechanisms: untrusted access networks and trusted access networks. Untrusted access networks include access networks that may pose a higher security risk (for example, a public WLAN or femtocell access network). Trusted access networks include access networks that the network operator considers have a level of trust from a security stand point and may interface directly with the EPC network.

In the new set of 5G standards, one of the most important features for the 5G System is that it offers converged core network that is access agnostic. Different access network types including 3GPP access and non-3GPP access can be supported via a common access network and core network interfaces. A Non-3GPP Access Network (N3AN) is considered as a 5G Access Network and part of the 5G System (5GS).

For untrusted non-3GPP access, a N3G access node N3IWF provides termination of signaling interfaces for control-plane and user-plane respectively, same as an NG-RAN node. Thus, 5G capable UEs can access 5G core network by connecting to Non-3GPP Access Network as a 5G Access Network via the N3IWF. The N3IWF relays uplink and downlink control-plane signaling between the UE and AMF, such that the UE has a direct control plane signaling connection towards the AMF. In addition, the N3IWF provides user plane connection between the UE and UPF for the PDU sessions over a non-3GPP access network.

When a UE is registered to the 5G core over both 3GPP access and non-3GPP access networks, multiple Non-Access Stratum (NAS) connections can be active at the same time. The UE can be registered in the same PLMN or different PLMN. If the UE is accessing one PLMN over one type of access (e.g. 3GPP access) and accessing another PLMN over the other type of access (e.g. non-3GPP access), then different primary authentications are performed. After registration, the NAS connections serve different AMFs utilizing different security contexts. However, if the UE requests registration in the same serving network over different types of access networks, a common 5G NAS security context is created during the registration procedure over the first access type, and all NAS connections are served by the same AMF.

Currently, for 3GPP access, it is assumed that the NAS connection identifier is "0". For non-3GPP access, it is assumed that the NAS connection identifier is "1". A problem arises when additional non-3GPP access network types are added in future releases, e.g. trusted WLAN access, wireline access, MuLteFire access, etc. These different types of non-3GPP access networks would each need to establish separate NAS connections. However, the currently there is only the one NAS connection identifier of "1" for NAS connections over the different types of non-3GPP access networks.

Therefore, a need exists to provide a system and method that supports NAS connections over a plurality of different types of non-3GPP access networks. Other needs and benefits are also provided with embodiments described herein.

SUMMARY

Embodiments are described herein that provide a system, device, method, and/or computer program product for providing network services to unauthenticated user equipment. For example, various methods are described for session establishment for an unauthenticated UE in a trusted non-3GPP access network.

According to an embodiment, user equipment is provided that comprises: one or more transceivers configured to access a serving network over a plurality of access network types; a memory device configured to store a mapping table; and a processing device configured to: generate a request for registration to the serving network over a first access network, wherein the request includes a first access network type of the first access network; receive a response indicating NAS connection establishment is accepted by the serving network, wherein the response includes the first access network type and NAS connection identifier; and update the mapping table to include the first access network type and NAS connection identifier. In some embodiments, the first access network type includes a value indicating at least one of: 3GPP access, untrusted non-3GPP access, trusted non-3GPP access, untrusted WLAN access, trusted WLAN access or MuLteFire access. In some embodiments, the processing device is further configured to: update the mapping table to include the first access network type, NAS connection identifier, access network identifier and serving network identifier. In some embodiments, the processing device may be further configured to: generate a second request for registration to the serving network over a second access network having a second access network type, wherein the second request includes the second access network type of the second access network; receive a response indicating connection establishment is accepted by the serving network, wherein the response includes the second access network type and a second NAS connection identifier; and update the mapping table to include the second access network type and the second NAS connection identifier. In some embodiments, the second access network type is different from the first access network type and wherein the second access network type indicates a second different one of: 3GPP access, untrusted non-3GPP access, trusted non-3GPP access, untrusted WLAN access, trusted WLAN access or MuLteFire access. In some embodiments, the processing device may be further configured to: generate a third request for registration to the serving network over a third access network having a third access network type, wherein the third request includes the third access network type of the third access network; receive a response indicating connection establishment is accepted by the serving network, wherein the response includes the third access network type and a third NAS connection identifier; and update the mapping table to include the third access network type and the third NAS connection identifier. In some embodiments, the third access network type is different from the first and second access network types and wherein the third access network type indicates a third different one of: 3GPP access, untrusted non-3GPP access, trusted non-3GPP access, untrusted WLAN access, trusted WLAN access or MuLteFire access. In some embodiments, the processing device is further configured to: use existing NAS security context established over the first access network with the serving network. In some embodiments, the processing device is further configured to: receive a request to perform authentication for connection over the third access network; obtain a new NAS security context from the serving network over the third access network; establish the NAS connection using the new NAS security context over the third access network; activate the new NAS security context for the first and second access networks; and delete the prior NAS security context.

According to another embodiment, user equipment is provided that comprises: one or more transceivers configured to access a serving network over a plurality of access network types; a processing device configured to: generate a request for registration to the serving network over an access network; and receive a registration reject message, wherein the registration reject message indicates that the serving network is not authorized. In some embodiments, the registration reject message includes a cause information element, wherein the cause information element includes a value corresponding to "Serving Network Not Authorized." In some embodiments, the processing device is further configured to: abort registration with the serving network; store an identity of the serving network in a list of unauthorized serving networks [the "forbidden PLMN list"]. In some embodiments, the processing device is further configured to select another serving network for registration.

According to another embodiment, an authentication server function in a node of a core network, comprising: a transceiver configured to communicate with one or more other nodes in the core network; a processing device configured to: receive an authentication request for a UE requesting access to a serving network, wherein the authentication request includes an identifier of the serving network and a subscriber identity; and determine the serving network is not authorized; and generate an authentication response, wherein the authentication response indicates that the serving network is not authorized. In some embodiments, the authentication response may include a cause information element, wherein the cause information element includes a value corresponding to "Serving Network Not Authorized."

According to another embodiment, user equipment may be provided that comprises: a transceiver configured to communicate with one or more types of access networks; a processing device configured to generate a SUCI by: determine one of a plurality of SUPI formats; determine one of a plurality of types of identity for a subscriber identifier; determine a scheme output from the subscriber identifier using a protection scheme; and construct the SUCI including a SUPI format value, a type of identity value and the scheme-output. In some embodiments, the one of the plurality of types of identity for the subscriber identifier includes one of: SUCI, 5G-GUTI, IMEL 5G-S-TMSI, IMEISV, MAC address, or a device identity. In some embodiments, the one of the plurality of SUPI formats includes at least one of: IMSI, IMSI based NAI, NON-IMSI based NAI or MF-NAI. In some embodiments, the processing device is further configured to generate the SUCI by selecting one of a plurality of network types and including a network type indicator for the selected network type in the SUCI structure.

According to another embodiment, an apparatus can be provided that comprises: at least one processor and at least one memory including computer program instructions, the at least one memory and the computer program instructions configured to, with the at least one processor, cause the apparatus at least to: generate a request for registration to a serving network over an access network; receive a registration reject message, wherein the registration reject message indicates that the serving network is not authorized by a home network of the apparatus; and, in response to receiving the registration reject message indicating that the serving network is not authorized by the home network of the apparatus, enter a deregistered state such that the apparatus is configured to request registration to another serving network. In some embodiments, the registration reject message includes a cause information element, wherein the cause information element includes a value indicative of that the serving network is not authorized by the home network of the apparatus. In some embodiments, the at least one processor is further configured to: abort registration with the serving network; and store an identity of the serving network in a list of unauthorized serving networks. In some embodiments, the at least one processor is further configured to select said another serving network for registration. In some embodiments, the registration reject message indicates that the serving network is not authorized, by the home network of the apparatus, for third generation partnership project (3GPP) access to the serving network. In some embodiments, the at least one processor is further configured to: in response to receiving the registration reject message indicating that the serving network is not authorized by the home network of the apparatus, set a fifth generation system (5GS) update status to 5U2 NOT UPDATED.

According to another embodiment, an apparatus can be provided that comprises: at least one processor and at least one memory including computer program instructions, the at least one memory and the computer program instructions configured to, with the at least one processor, cause the apparatus at least to: receive an authentication request for a user equipment requesting access to a serving network, wherein the authentication request includes an identifier of the serving network and a subscriber identity; determine whether the serving network is authorized; and, in an instance in which the serving network is not authorized, generate an authentication response, wherein the authentication response indicates that the serving network is not authorized by a core network associated with the apparatus. In some embodiments, the authentication response includes a cause information element, wherein the cause information element includes a value indicative of that the serving network is not authorized by the core network.

According to another embodiment, an apparatus can be provided that comprises: at least one processor and at least one memory including computer program instructions, the at least one memory and the computer program instructions configured to, with the at least one processor, cause the apparatus at least to: communicate with a core network via a selected type of access network; and construct a subscription concealed identifier used to identify the apparatus during communication with the core network and the selected type of access network, the subscription concealed identifier including at least: a subscription permanent identifier format type value corresponding to one of a plurality of subscription permanent identifier format types, the subscription permanent identifier format type value being associated with a subscription permanent identifier, a protection scheme identifier corresponding to one of a plurality of protection schemes preconfigured for the subscription permanent identifier, and a scheme output derived from the subscription permanent identifier using one of the protection schemes preconfigured for the subscription permanent identifier. In some embodiments, the subscription permanent identifier comprises one of: an international mobile subscriber identity (IMSI) or network specific identifier type, the corresponding subscription permanent identifier format type value thereby allowing for identification of the subscriber identifier format type from among IMSI or network specific identifier types. In some embodiments, the subscription concealed identifier is transmitted to the core network as a mobile identity parameter with a type of identity field indicating a subscription concealed identifier identity type. In some embodiments, the mobile identity parameter comprises a fifth generation system (5GS) mobile identity parameter, and the subscription concealed identifier (SUCI) identity type comprises a SUCI identity type. In some embodiments, the subscription permanent identifier format type value of the subscription concealed identifier is encoded in a subscription permanent identifier (SUPI) format field of the 5GS mobile identity parameter.

According to another embodiment, an apparatus can be provided that comprises: at least one processor and at least one memory including computer program instructions, the at least one memory and the computer program instructions configured to, with the at least one processor, cause the apparatus at least to: receive, from user equipment, via a selected type of access network, a subscription concealed identifier, the subscription concealed identifier including at least: a subscription permanent identifier format type value corresponding to one of a plurality of subscription permanent identifier format types, the subscription permanent identifier format type value being associated with a subscription permanent identifier, a protection scheme identifier corresponding to one of a plurality of protection schemes preconfigured for the subscription permanent identifier, and a scheme output derived from the subscription permanent identifier using one of the protection schemes preconfigured for the subscription permanent identifier; and identify the user equipment, during communication with the user equipment via the selected type of access network, based at least on the subscription concealed identifier. In some embodiments, the subscription permanent identifier comprises one of: an international mobile subscriber identity (IMSI) or network specific identifier type, the corresponding subscription permanent identifier format type value thereby allowing for identification of the subscriber identifier format type from among IMSI or network specific identifier types. In some embodiments, the at least one memory and the computer program instructions are configured to, with the at least one processor, cause the apparatus at least to: identify, based at least upon the corresponding subscription permanent identifier format type value, the subscriber identifier format type from among IMSI or network specific identifier types. In some embodiments, the subscription concealed identifier is received by the apparatus as a mobile identity parameter with a type of identity field indicating a subscription concealed identifier identity type. In some embodiments, the mobile identity parameter comprises a fifth generation system (5GS) mobile identity parameter, and the subscription concealed identifier (SUCI) identity comprises a SUCI identity type. In some embodiments, the subscription permanent identifier format type value of the subscription concealed identifier is encoded in a subscription permanent identifier (SUPI) format field of the 5GS mobile identity parameter.

BRIEF DESCRIPTION OF DRAWINGS

FIG. 5 illustrates a schematic block diagram of an embodiment of a Serving Network and Access Type to NAS connections mapping table, in accordance with some embodiments described herein;

FIG. 6 illustrates a schematic block diagram of an embodiment of content of a registration request message, in accordance with some embodiments described herein;

FIG. 8 illustrates a schematic block diagram of an embodiment of the access type values for the access type information element in a registration request message, in accordance with some embodiments described herein;

FIG. 10 illustrates a schematic block diagram of an embodiment of a Serving Network and Access Type to NAS connections mapping table after registration with an access type A, access type B, and access type C, in accordance with some embodiments described herein;

FIG. 12 illustrates a schematic block diagram of an embodiment of a Serving Network and Access Type to NAS connections mapping table after registration with an access type A, access type B, and access type C, in accordance with some embodiments described herein;

FIG. 16 illustrates a schematic block diagram of an embodiment of a new information field for a Subscription Concealed Identifier (SUCI) to enable different SUCI structures, in accordance with some embodiments described herein;

FIG. 17 illustrates a schematic block diagram of an embodiment of identity types supported by the new information field for the Subscription Concealed Identifier (SUCI), in accordance with some embodiments described herein;

FIG. 23 illustrates a schematic block diagram of an embodiment of the SUCI identity type, in accordance with some embodiments described herein;

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof.

Some of the abbreviations that are described herein are expanded below for convenience:

5GC 5G Core
5GS 5G System
5G-AN 5G Access Network
5G-GUTI 5G Globally Unique Temporary Identifier
5G-S-TMSI 5G S-Temporary Mobile Subscription Identifier
5QI 5G QoS Identifier
AKA Authentication and Key Agreement
AMF Core Access and Mobility Management Function
AUSF Authentication Server Function
EAP Extensible Authentication Protocol
HPLMN Home Public Land Mobile Network
IKEv2 Internet Key Exchange v2
IMSI International Mobile Subscriber Identity
IMEI International Mobile Equipment Identity
IPsec Internet protocol security
MCC Mobile Country Code
MCM Multi-Connection Mode
MNC Mobile Network Code
N3IWF Non-3GPP Interworking Function
NAI Network Access Identifier
NAS Non-Access Stratum
ngKSI Key Set Identifier in 5G System
NHN-ID Neutral Host Network ID
PDN Packet Data Network
PLMN Public Land Mobile Network
QoS Quality of Service
SA Security Association
SCM Single-Connection Mode
SMC Security Mode Command
SUCI Subscription Concealed Identifier
SUPI Subscription Permanent Identifier
UDM Unified Data Management
UE User Equipment
UICC Universal Integrated Circuit Card
USIM UMTS Subscriber Identity Mobile One or more embodiments are described herein that provide a system and method for providing network services to unauthenticated user equipment. For example, various methods are described for session establishment for an unauthenticated UE in a trusted non-3GPP access network.

Figure 1:
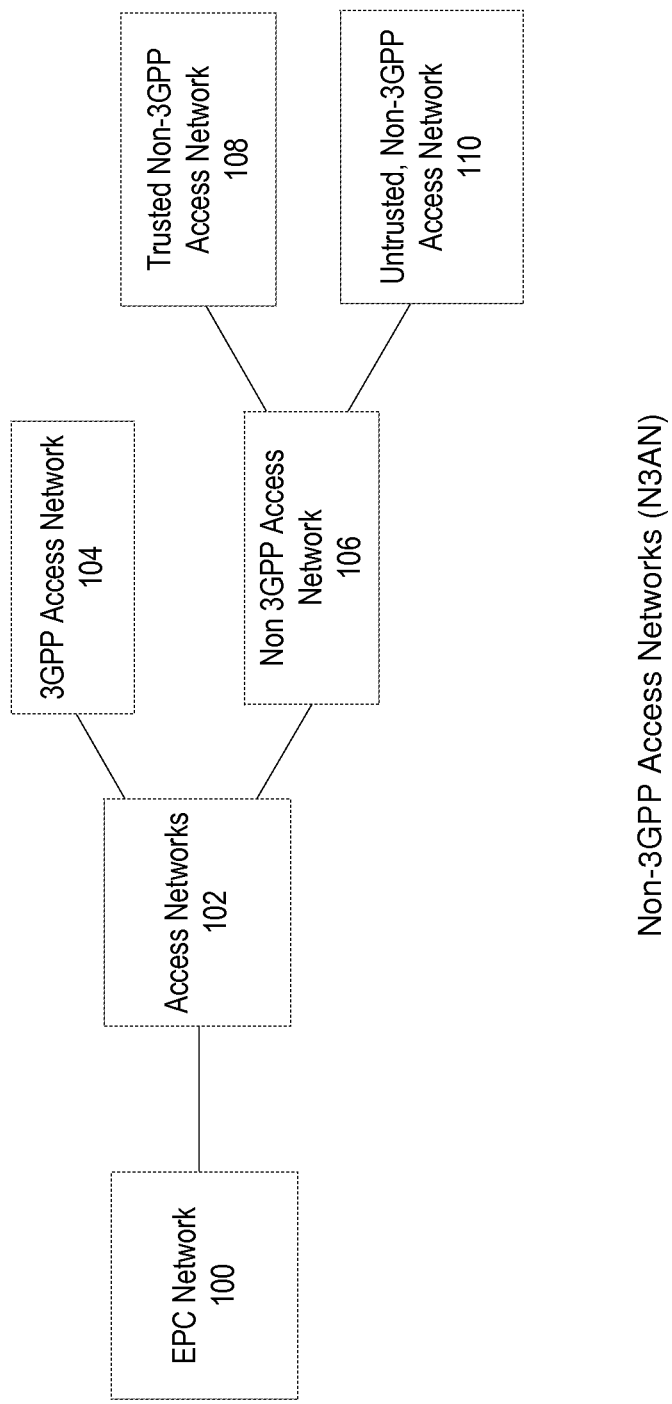
FIG. 1 illustrates a schematic block diagram of an embodiment of types of access networks for an evolved packet core that is fully or partially compliant with the 3rd Generation Partnership Project (3GPP) set of standards or other type of internet protocol (IP) data packet core network standards, in accordance with some embodiments described herein.

FIG. 1 illustrates a schematic block diagram of an embodiment of types of access networks for an evolved packet core that is fully or partially compliant with the 3rd Generation Partnership Project (3GPP) set of standards or other type of internet protocol (IP) data packet core network standards. This architecture is described in more detail in the technical standard 3GPP TS 23.402 V14.2.0 (December 2016) entitled, "3rd Generation Partnership Project; Technical Specification Group Services and System Aspects; Architecture enhancements for non-3GPP accesses," which is hereby incorporated by reference herein.

In 3GPP architecture, the EPC network 100 is communicatively coupled to one or more access networks 102. In an embodiment, the access networks 102 may include one or more 3GPP access networks 104 or one or more non-3GPP access networks 106. The 3GPP access networks 104 are wholly or partially compliant with technologies specified by the 3GPP set of standards and include, e.g. GPRS, UMTS, EDGE, HSPA, LTE and LTE Advanced. The non-3GPP access networks 106 are wholly or partially compliant with technologies that are not specified by the 3GPP set of standards. The non-3GPP access networks 106 may be so specified in the 3GPP set of standards. The non-3GPP access networks 106 may include one or more non-3GPP trusted access networks 108 or one or more non-3GPP, non-trusted access networks 110.

The trusted non-3GPP access networks 108 are operator-built or operator supported wireless local area networks (WLAN), such as an IEEE 802.11x compliant WLAN network, with encryption and a secure authentication method. In one embodiment, the trusted, non-3GPP access network 108 supports the following example features: 802.1x-based authentication which in turn also requires encryption of the radio access network (RAN), 3GPP-based network access using EAP method for authentication, and IPv4 and/or IPv6 protocols. However, an operator may determine that other types of non-3GPP access networks with different types of security are to be considered trusted. The untrusted non-3GPP access networks 110 include non-3GPP access networks that are unknown to an operator or do not include supported authentication standards. For example, an untrusted non-3GPP access network may include a home or public WLAN, such as an IEEE 802.11x compliant WLAN network that is open to the public, home WLAN or another non-operator originated and managed.

Another set of protocols for Fifth-Generation wireless, or 5G, is the latest iteration of cellular technology, engineered to greatly increase the speed and responsiveness of wireless networks. The term 5G was initially defined by the ITU IMT-2020 standard, which required a theoretical peak download capacity of 20 gigabits. More recently, the industry standards group 3GPP is defining the 5G architecture and protocols. For example, Technical Specification (TS) 23.501 defines Stage-2 System Architecture for the 5G System which includes Network Slicing. Technical Specification (TS) 23.502 defines procedures for the 5G System. Technical Specification (TS) 23.503 defines Policy and Charging Control Framework for the 5G System.

In 5G systems, 5G access network may include, e.g. a Next Generation (NG) Radio Access Network (NG-RAN) as described in 3GPP TS 38.300. In addition, a 5G access network may include an untrusted non-3GPP Access Network in which the UE may connect to the 5G core network, e.g., via a secured IPSec/IKE tunnel terminated on a Non-3GPP Interworking Function (N3IWF). The non-3GPP Access Network (N3AN) is considered as a 5G Access Network and part of the 5G System (5GS).

For untrusted non-3GPP access, the access node including N3IWF provides termination of N2 and N3 signaling interfaces for control-plane and user-plane respectively. The 5G capable UEs access the 5G core network by connecting to the Non-3GPP Access Network (as a 5G Access Network) via the N3IWF. The N3IWF relays uplink and downlink control-plane NAS (N1) signaling between the UE and the 5G core network, makes it possible for the UE to have direct NAS signaling connection towards the core network. In addition, the N3IWF provides user plane connection between the UE and the core network for PDU sessions over the non-3GPP access network.

Figure 2:
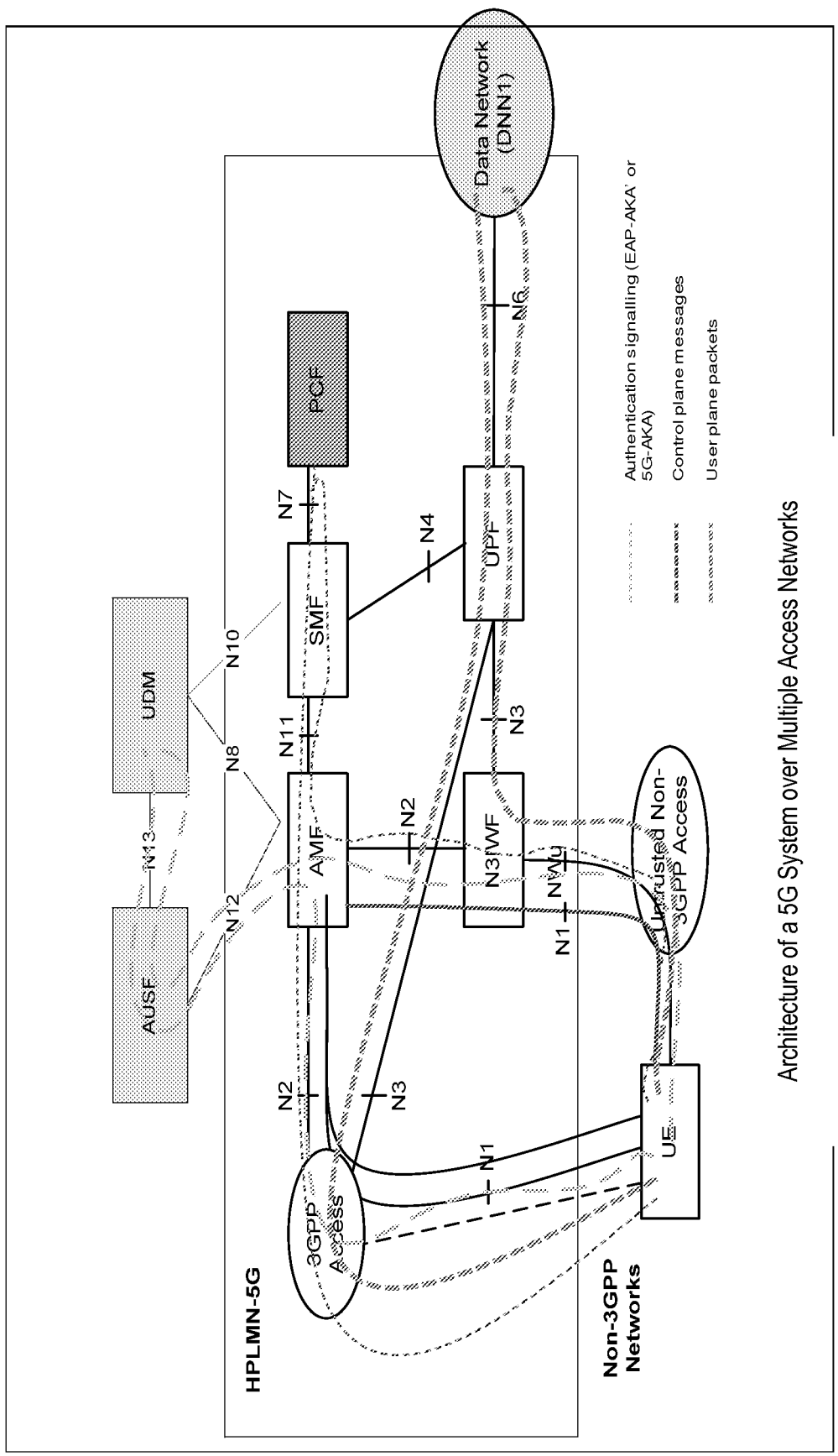
FIG. 2 illustrates a schematic block diagram of an embodiment of a 5G System Architecture for non-3GPP access, in accordance with some embodiments described herein.

FIG. 2 illustrates a schematic block diagram of an embodiment of a 5G System Architecture for non-3GPP access. This architecture is described in more detail in the technical standard 3GPP TS 23.501, Release 15 (December 2017) entitled, "System Architecture for the 5G System," which is incorporated by reference herein.

Non-3GPP access networks are connected to the 5G Core Network via a Non-3GPP Interworking Function (N3IWF). The N3IWF interfaces the 5G Core Network control plane (CP) and user plane (UP) functions via N2 and N3 interfaces, respectively. A UE establishes an IPSec tunnel with the N3IWF to attach to the 5G Core Network over the untrusted non-3GPP access network. The UE is authenticated by and attached to the 5G Core Network during the IPSec tunnel establishment procedure. Further details for UE attachment to 5G Core Network over untrusted non-3GPP access are described in 3GPP TS 23.502, Release 15 (December 2017) entitled, "Procedures for the 5G System," which is hereby incorporated by reference herein.

The 5G System includes a Home Public Land Mobile Network or Equivalent Home PLMN (HPLMN-5G) including an Access and Mobility Management function (AMF). The AMF provides for the termination of the RAN control plane interface (N2) and termination of NAS (N1) set of protocols and NAS ciphering and integrity protection. The AMF also provides registration and connection management. The AMF may include various functionality to support non-3GPP access networks. For example, the AMF may provide support of N2 interface control protocols with the N3IWF as well as support of NAS signalling with a UE over the N3IWF. In addition, the AMF may provide support of authentication of UEs connected over the N3IWF and management of mobility, authentication, and separate security context state(s) of a UE connected via the non-3GPP access or connected via 3GPP and non-3GPP accesses simultaneously.

The Session Management function (SMF) includes session management functionality, e.g. session establishment, modify and release, including tunnel maintenance between the UPF and AN node. The SMF also provides for UE IP address allocation & management (including optional Authorization) and DHCPv4 (server and client) and DHCPv6 (server and client) functions.

The User plane function (UPF) provides an external PDU Session point of interconnect to Data Network and Packet routing & forwarding. The UPF also supports the User Plane part of policy rule enforcement, e.g. Gating, Redirection, Traffic steering, etc.

The Policy Control Function (PCF) supports a unified policy framework to govern network behaviour. The Unified Data Management (UDM) includes support for generation of 3GPP AKA Authentication Credentials, Access authorization based on subscription data (e.g. roaming restrictions), and UE's Serving NF Registration Management (e.g. storing serving AMF for UE, storing serving SMF for UE's PDU Session). It also provides SMS and subscription management. To provide this functionality, the UDM uses subscription data (including authentication data) that may be stored in the UDR. The AUSF provides Authentication Server Function (AUSF).

The functionality of N3IWF in case of untrusted non-3GPP access includes the support of IPsec tunnel establishment with the UE. The N3IWF terminates the IKEv2/IPsec protocols with the UE over NWu and relays over N2 the information needed to authenticate the UE and authorize its access to the 5G Core Network. The N3IWF provides termination of N2 and N3 interfaces to 5G Core Network for control—plane and user-plane respectively. The N3IWF relays uplink and downlink control-plane NAS (N1) signaling between the UE and AMF. The N3IWF provides handling of N2 signaling from SMF (relayed by AMF) related to PDU Sessions and QoS. The N3IWF further provides for the establishment of IPsec Security Association (IPsec SA) to support PDU Session traffic. The N3IWF also provides for relaying uplink and downlink user-plane packets between the UE and UPF.

Figure 3:
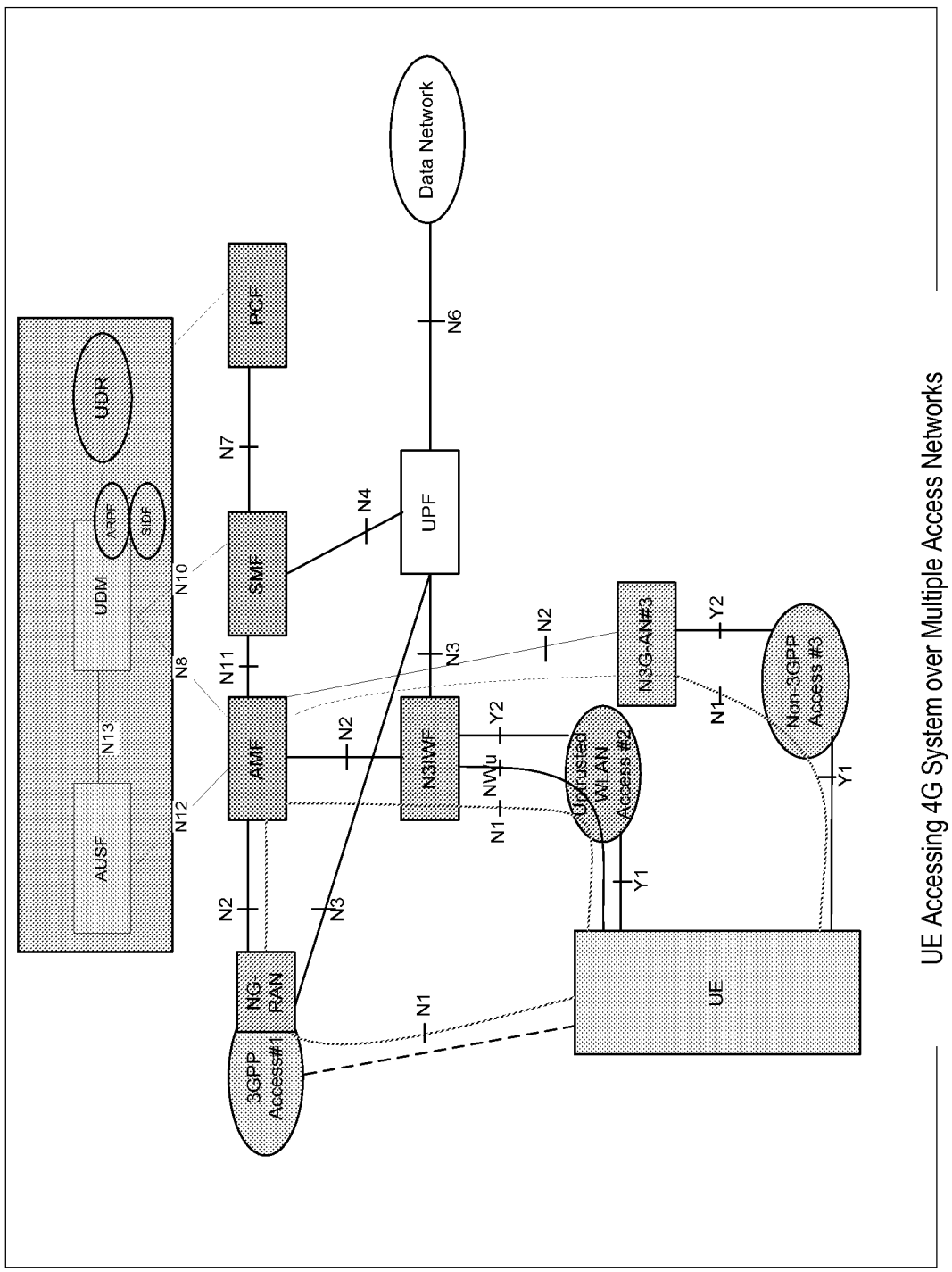
FIG. 3 illustrates a schematic block diagram of an embodiment of a UE accessing the 5G system over multiple heterogenous access networks, in accordance with some embodiments described herein.

FIG. 3 illustrates a schematic block diagram of an embodiment of a UE accessing the 5G system over multiple heterogenous access networks. The multiple heterogenous access networks include, e.g., 3GPP access, untrusted WLAN access and Non-3GPP access. When the UE is registered to the 5G core over both 3GPP access and non-3GPP access networks, multiple control plane NAS signaling connections are active between the UE and the AMF at the same time.

When the UE establishes a secure connection, it sends a "Registration Request" message to the AMF/SEAL. The Registration request message includes the 5GS mobile identity IE which contains either the SUCI, 5G-GUTI or IMEI. After receiving the registration request message from the UE, the AMF/SEAF prepares an "Authentication Initiation Request" (5G-AIR) message to the AUSF. The SEAF also includes the serving network name into the 5G-AIR message. After receiving the 5G-AIR message from the SEAF, the AUSF prepares "Auth-Info-Req" message and sends to the UDM/ARPF. The UDM/ARPF first generates an authentication vector with Authentication Management Field (AMF) separation bit=1. The UDM/ARPF then compute CK' and IK'. After that ARPF sends (RAND, AUTN, XRES, CK', IK') to the AUSF using the Auth-Info-Rsp message. The AUSF responds to the SEAF by sending 5G-AIA message which in turn includes EAP-Request/AKA'-Challenge message. The SEAF transparently forwards the EAP-Request/AKA'-Challenge message to the UE in a NAS message Auth-Req message. After receiving a response from the UE for the Auth-Req message, the SEAF forwards the EAP Response to the AUSF, and the AUSF validates the same with the stored information. In case of successful verification, AUSF sends EAP-SUCCESS and Anchor key to SEAF and then SEAF responds to UE with EAP-SUCCESS. If the AUSF received SUCI from SEAF when the authentication was initiated, then the AUSF also includes the SUPI while sending EAP-SUCCESS message.

If the UE is accessing one PLMN over one type of access (e.g. 3GPP access) and accessing another PLMN over another type of access (e.g. non-3GPP access), then different primary authentications are performed. After registration, the NAS connections are served by different AMFs utilizing different security contexts. However, as shown in FIG. 3, the UE may request registration in the same serving network (e.g., same HPLMN-5G) over different types of access. All the NAS connections for the UE are then served by the same AMF.

Currently, when the UE is registered in a serving network over different types of access, the assignment of NAS connection identifiers is hard-coded. For example, the 3GPP TSG #80 Plenary Meeting approved the completion of the standalone (SA) Release 15, 5G specifications, dated Jul. 15, 2018 (REL-15) and incorporated by reference herein. In REL-15, it is assumed that the NAS connection identifier is "0" for 3GPP access. For non-3GPP access, it is assumed that the NAS connection identifier is "1". This assignment of hard-coded connection identifiers did not present a problem in Rel-15 as only one type of non-3GPP access was supported, e.g. untrusted WLAN access. However, it is foreseen that additional non-3GPP access network types will be added in future releases, e.g. trusted WLAN access, wireline access, MuLteFire access, etc. Different types of non-3GPP access networks each need to establish separate NAS connections. Depending on the network configuration and UE service subscription, the UE may be simultaneously connected to multiple access networks, for example, to 3GPP access and multiple non-3GPP access networks as show in FIG. 2. In this situation, using the same NAS connection identifier for connections over different non-3GPP access networks would not work.

In addition, different access types may be activated in different sequences. For example, it is possible that the UE receives authentication over one of the non-3GPP access networks first and establishes a NAS security context before the UE registers via a 3GPP access network. In another possibility, the UE registers via multiple non-3GPP access networks but not over a 3GPP access network. As such, a more flexible binding between the serving network and access type pair and NAS connection is desired.

In order for the UE to verify it is connected to a serving network that is authorized to provide services to the UE, the serving network needs to be verified by the home network during authentication (AKA) procedures. The verification is implicit as it is assumed that if primary authentication and key agreement procedure has completed successfully, the serving network is authorized. However, the failure case should not be implicit and needs to be defined explicitly.

Finally, in a 5G system, a subscriber identifier is called a Subscription permanent identifier (SUPI). The SUPI can be defined in either an IMSI or NAI format. To ensure Subscriber privacy, the SUPI should not be transferred in clear text over a 5G RAN and is concealed over-the-air by using the Subscription Concealed Identifier (SUCI). The SUCI is generated using a protection scheme with the raw public key that was securely provisioned in control of the home network. Only the subscription identifier part of the SUPI is concealed, while the home network identifier part of the SUPI needs to remain clear for routing purpose.

The routing information may be different for different access network types. For a 3GPP access network, Mobile Country Code (MCC) and Mobile Network Code (MNC) may be part of the routing information. However, for a non-3GPP access network, a different network identifier and routing information may be used. For example, for MuLteFire type access network, the network identifier and routing information are based on a Neutral Host Network ID (NHN-ID), Participating Service Provider ID (PSP-ID) and Neutral Host Access Mode Indicator (NHAMI). NHAMI is a reserved global value that is the same for all MuLteFire networks enabling NHN Access Mode. There is a need to define the coding of the SUCI information element in a generic way for the SUCI to support other types of networks and subscriber identifier formats to be used as a mobile identity during the authentication procedure.

Also given that both IMSI and NAI formats can be used for SUPI, for SUCI schema output, MSIN corresponds to the representation in case the subscription identifier is in IMSI format and username corresponds to the representation in case the subscription identifier is in NAI format. For IMSI based NAI, the subscriber identifier part of NAI is also made of digits, so additional encoding rules are needed to distinguish the IMSI format, NAI format and potentially other types of subscriber identifier formats within the SUCI information element definition.

One or more embodiments described herein provide systems and methods for enabling concurrent secure connections over multiple heterogeneous access networks. New methods and protocol enhancements are described to allow the UE to include an access type during registration and to track concurrent NAS connections mapping over heterogenous access networks. New systems and methods for handling serving network verification failure are also described. New systems and methods and protocol enhancements are further described to support using NAI as one type of subscription identifier as well as future extensibility of subscription identifier for support of MuLteFire access networks and private networks.

1. Embodiment—UE Includes Access Type During Registration and Ability for Tracking Concurrent NAS Connections Mapping Over Heterogenous Access Networks a) UE Initiates Initial Registration Over Access Type A.

Figure 4:
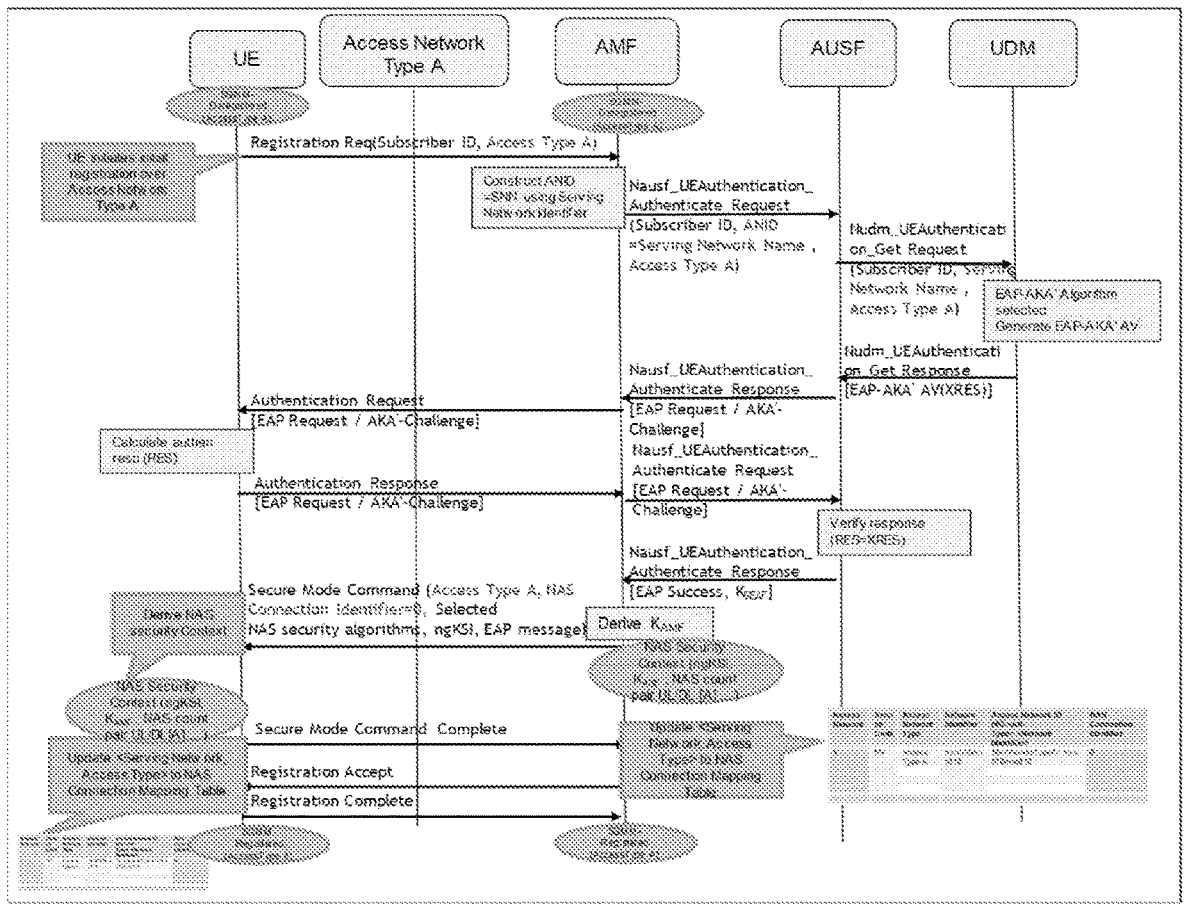
FIG. 4 illustrates a logical flow diagram of an embodiment of a method for authentication and key agreement message flow between UE and core network functions when the UE initiates initial registration over Access Network Type A, in accordance with some embodiments described herein.

FIG. 4 illustrates a logical flow diagram of an embodiment of a method for authentication and key agreement message flow between UE and core network functions when the UE initiates initial registration over Access Network Type A. The NAS messages shown between the UE and AMF may be tunneled via an IPsec tunnel in case the Access Network Type A is an untrusted non-3GPP access. For example, the UE may establish an IPsec Security Association (SA) with the selected N3IWF by initiating an Internet Key exchange (IKE) protocol initial exchange, e.g. as described in IETF RFC 7296, "Internet Key Exchange Protocol Version 2 (IKEv2)," (October 2014). In this example, Access Network Type A is a first type of a plurality of types of networks, including 3GPP access, trusted non-3GPP access, untrusted non-3GPP access, untrusted WLAN access, trusted WLAN access, MuLteFire access, etc.

When the UE initiates the initial registration over Access Network Type A, the UE includes the Access Type in the registration request message. The registration request message is sent by the UE to the AMF. The AMF is collocated with SEcurity Anchor Function (SEAF) which serves as the anchor for security in 5G Systems. Upon receiving the registration request message, the AMF/SEAF invokes the Nausf_UEAuthentication service by sending a Nausf_UEAuthentication_Authenticate Request message to the AUSF to initiate an authentication. The SEAF includes the Subscribe Id, the Serving network name and Access type in the Nausf_UEAuthentication_Authenticate Request.

After receiving the Nausf_UEAuthentication_Authenticate Request message, the AUSF compares the received Serving network name with the expected serving network name. If the requesting SEAF in the serving network is authorized to use the serving network name, the AUSF sends the Nudm_UEAuthentication_Get Request to the UDM including the Subscribe Id, the Serving network name and Access type.

After reception of the Nudm_UEAuthentication_Get Request, the UDM/ARPF chooses the authentication method, based on the subscription data. For example, an EAP-AKA' mutual authentication type protocol as modified herein may be executed between the UE and AUSF (such as EAP-AKA' described in IETF RFC 5448, "Improved Extensible Authentication Protocol Method for 3rd Generation Authentication and Key Agreement (EAP-AKA') Mar. 5, 2018 and incorporated by reference herein).

The UDM/ARPF generates an authentication vector and sends this authentication vector AV' (RAND, AUTN, XRES, CK', IK') to the AUSF from which it received the Nudm_UEAuthentication_Get Request. The UDM/ARPF also transmits an indication that the authentication vector AV' is to be used for EAP-AKA' using a Nudm_UEAuthentication_Get Response message.

The AUSF and the UE then proceed with EAP-Request/AKA'-Challenge exchange. The AUSF derives the KAUSF and the KSEAF keys, and it includes an EAP Success message and the KSEAF inside Nausf_UEAuthentication_Authenticate Response message and sends it to the AMF/SERF.

After receiving the Nausf_UEAuthentication_Authenticate Response message, the AMF/SERF derives the KAMF key. The AMF then initiates Security mode command procedure to send the security context and security algorithm information to the UE. The UE receives the Security mode command and derives NAS security contexts and sends a Security mode command complete message to the AMF.

At the completion of the procedure, the Serving Network and Access Type to NAS connections mapping table is updated to include connection information for Access Network Type A, as shown in FIG. 5 below.

FIG. 5 illustrates a schematic block diagram of an embodiment of a Serving Network and Access Type to NAS connections mapping table. In this example, the mapping table is updated to include connection information for a first type of access network, e.g. Access Network Type A. The mapping table is updated after registration by a UE over an access network. The table includes the access network type, network identifier and access network identifier. The mapping table also includes the NAS connection identifier for the NAS connection between the Access Network Type A and the UE. The mapping table thus stores for each NAS connection, the NAS connection identifier, the access network type, network identifier, and access network identifier.

FIG. 6 illustrates a schematic block diagram of an embodiment of content of a registration request message. The registration request message is transmitted by the UE to the AMF over an access network to begin an initial registration. The registration request message includes an information element "Access Type" of the access network. The purpose of the access type information element is to indicate the access type over which the downlink signaling, or user data is to be sent to the UE.

Figure 7:
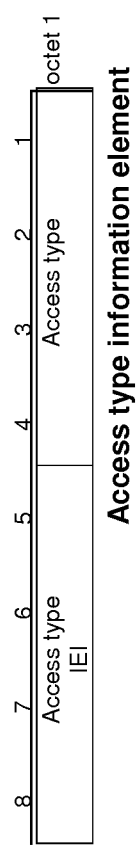
FIG. 7 illustrates a schematic block diagram of an embodiment of the access type information element in a registration request message, in accordance with some embodiments described herein.

FIG. 7 illustrates a schematic block diagram of an embodiment of the access type information element in a registration request message. The access type is a type 1 information element.

FIG. 8 illustrates a schematic block diagram of an embodiment of the access type values for the access type information element in a registration request message. In an embodiment, the access types include 3GPP access, untrusted non-3GPP access, trusted non-3GPP access, untrusted WLAN access, trusted WLAN access and MuLteFire access. Alternate or additional access types may be included in the access type information element in the registration message.

b1) UE Initiates Subsequent Registration Over Access Type C and Existing NAS Security Context is Reused When the UE initiates subsequent registration over another type of access network, e.g. access type C, and the UE is already authenticated by the network and is served by the same AMF in the same serving network, the AMF may decide not to run a new authentication if it has an available security context to use.

Figure 9:
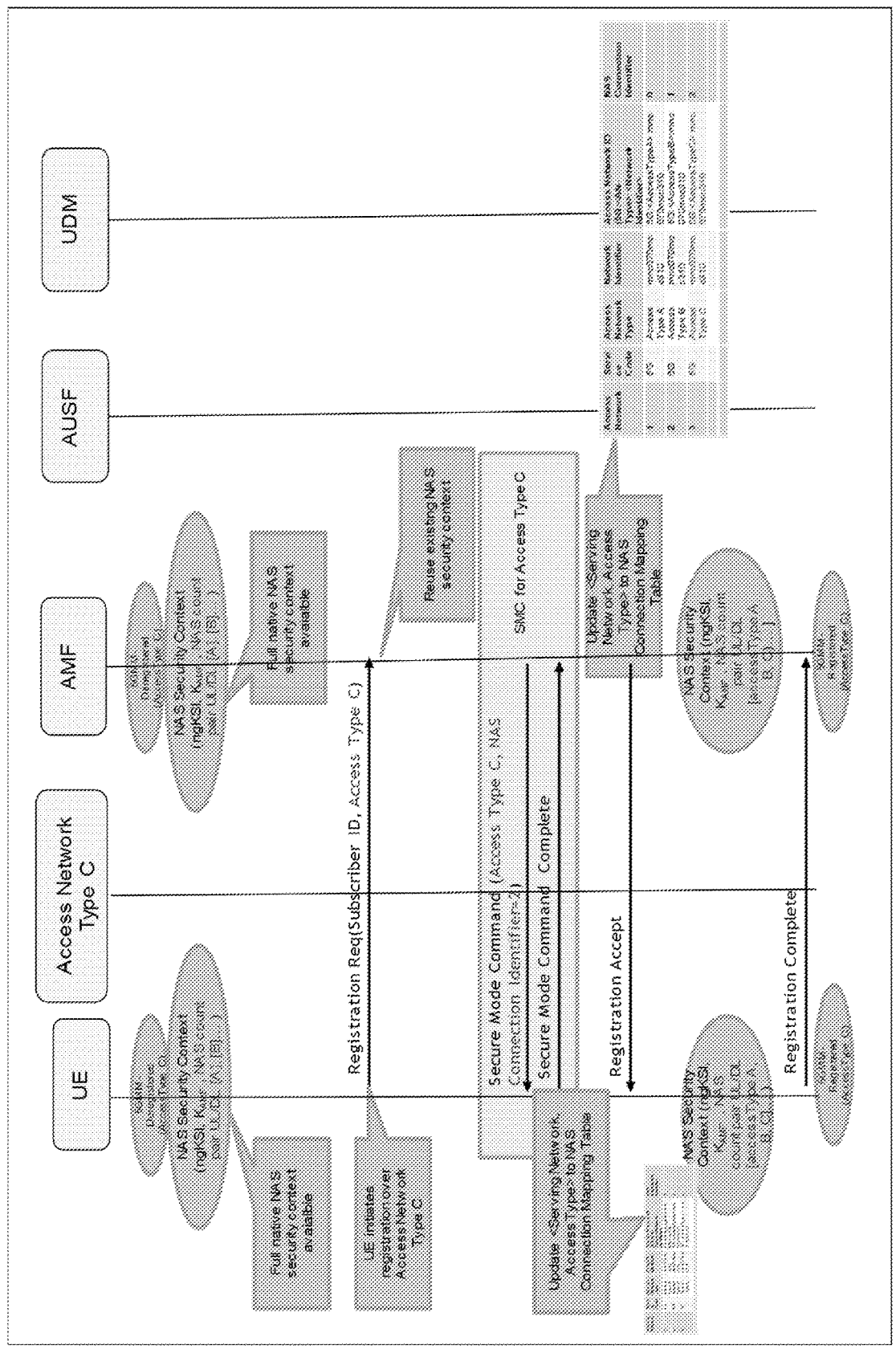
FIG. 9 illustrates a logical flow diagram of an embodiment of a method for registration by a UE over an Access Network Type C when existing NAS security context is reused, in accordance with some embodiments described herein.

FIG. 9 illustrates a logical flow diagram of an embodiment of a method for registration by a UE over an Access Network Type C when existing NAS security context is reused. It is assumed in this example, that the UE has established an NAS connection with Access Network Type A and Access Network Type B. Note that NAS messages shown between the UE and AMF are tunnelled via IPsec tunnel in case the Access Network Type C is an untrusted non-3GPP access.

When the UE initiates subsequent registration over another access network with Access Network Type C, it includes the Access Type in the registration request message. The AMF may decide to reuse the existing security context. A new NAS connection is created using the available common 5G NAS security context. The NAS security context is updated with parameters specific to the new NAS connection. At the completion of the procedure, the Serving Network and Access Type to NAS connections mapping table is updated to include connection information for Access Network C, as shown in FIG. 10.

FIG. 10 illustrates a schematic block diagram of an embodiment of a Serving Network and Access Type to NAS connections mapping table after registration with an access type A, access type B, and access type C. In this example, the mapping table is updated to include connection information for the access type C. The mapping table is updated after registration by the UE over an access network. The table includes the access network type, network identifier and access network identifier. The mapping table also includes the NAS connection identifier for the NAS connection between the Access Network Type C and the UE. The NAS connection identifier is "2". The mapping table may be stored in the UE and AMF and/or at other functions or nodes, such as the AUSF.

b2) UE Initiates Subsequent Registration Over Access Network Type C and New Authentication is Initiated When the UE initiates subsequent registration over access type C, if the UE is already authenticated by the network for the same serving network, the AMF can decide to run the authentication and key agreement procedure again either because the UE is served by a different AMF or due to security algorithm has changed.

Figure 11:
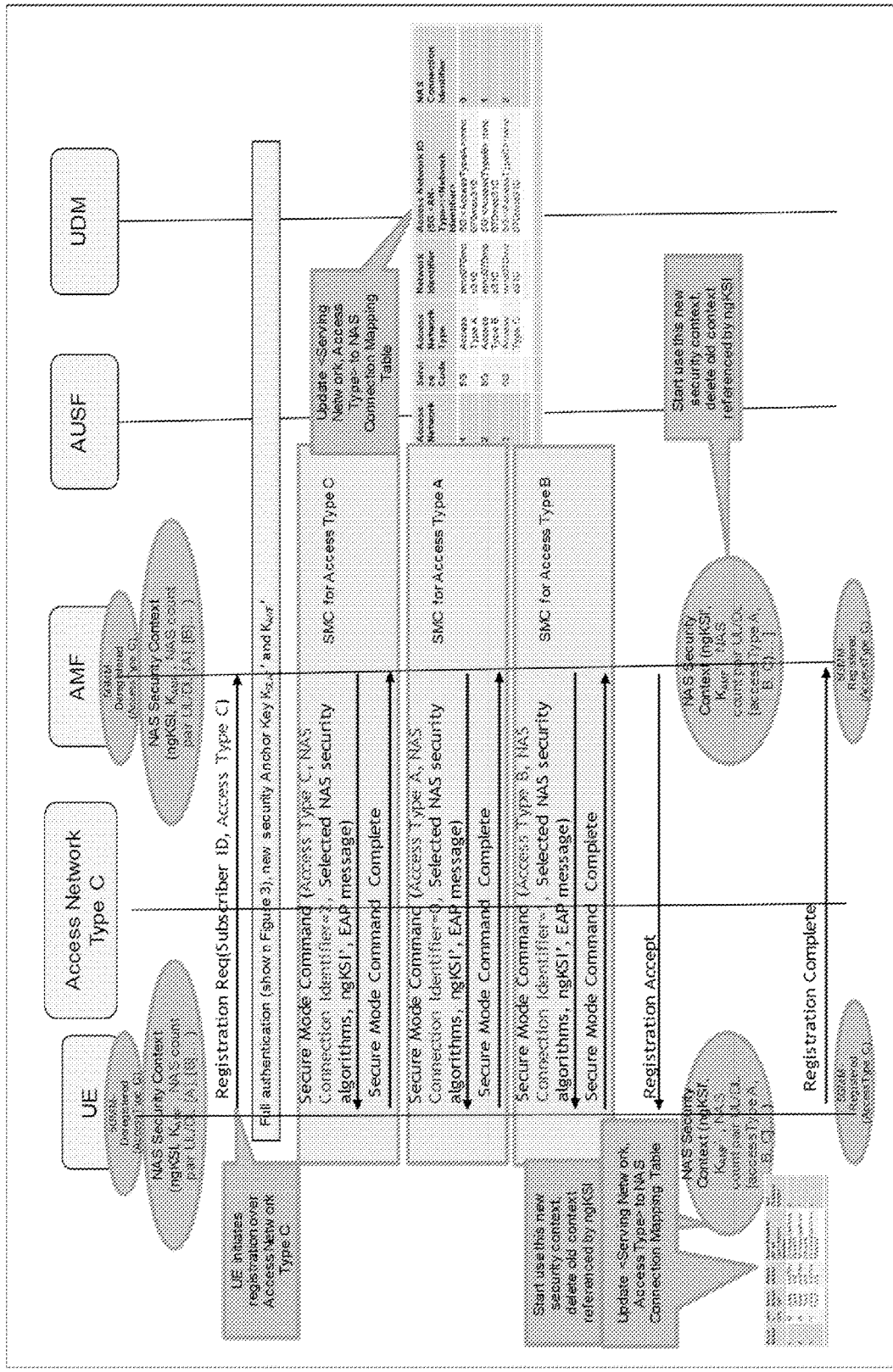
FIG. 11 is a logical flow diagram of an embodiment of a method for registration by the UE over an access network type C when new authentication is initiated, in accordance with some embodiments described herein.

FIG. 11 is a logical flow diagram of an embodiment of a method for registration by the UE over an access network type C when new authentication is initiated. It is assumed in this example, that the UE has established an NAS connection with Access Network Type A and Access Network Type B. Note that NAS messages shown between the UE and AMF are tunneled via IPsec tunnel if the Access Network Type C is untrusted non-3GPP access.

When the UE initiates subsequent registration over Access Network Type C, it includes the Access type in the registration request message. The AMF decides to run the authentication and key agreement procedure again. The AMF may decide to run the authentication and key agree-ment procedure again either because the UE is served by a different AMF or due to security algorithm has changed. When the authentication and key agreement procedure completes, new NAS security mode command is initiated by the AMF to the UE to activate the new derived 5G NAS security context on Access Type C.

A new NAS connection is created using the newly derived 5G NAS security context. The NAS security context is updated with parameters specific to the new NAS connection. The AMF then triggers additional NAS SMC procedures for all other Access Types in order to activate the new 5G NAS security context for each existing Access Type. After successful NAS SMC procedures over the other accesses types, both the UE and the AMF delete the old NAS security context. At the completion of the procedure, the Serving Network and Access Type to NAS connections mapping table is updated to include connection information for Access Network Type C, as shown in FIG. 12.

FIG. 12 illustrates a schematic block diagram of an embodiment of a Serving Network and Access Type to NAS connections mapping table after registration with an access type A, access type B, and access type C. In this example, the mapping table is updated to include connection information for the access type C. The mapping table is updated after registration by the UE over an access network. The table includes the access network type, network identifier and access network identifier. The mapping table also includes the NAS connection identifier for the NAS connection between the Access Network Type C and the UE. The NAS connection identifier is "2". The mapping table may be stored in the UE and AMF and/or at other functions or nodes, such as the AUSF.

2. Embodiment—Serving Network Authorization Failure

In order for the UE to verify it is connected to a serving network that is authorized to provide services to the UE, the serving network needs to be verified by the home network during AKA procedures. If the serving network is authorized, the AKA procedure would continue and if primary authentication and key agreement procedure has completed successfully, it would mean the serving network is authorized.

However, if the serving network is unauthorized, the authentication procedure would stop and the AUSF would send an authentication response to the AMF to indicate authentication failure due to the serving network not being authorized.

Figure 13:
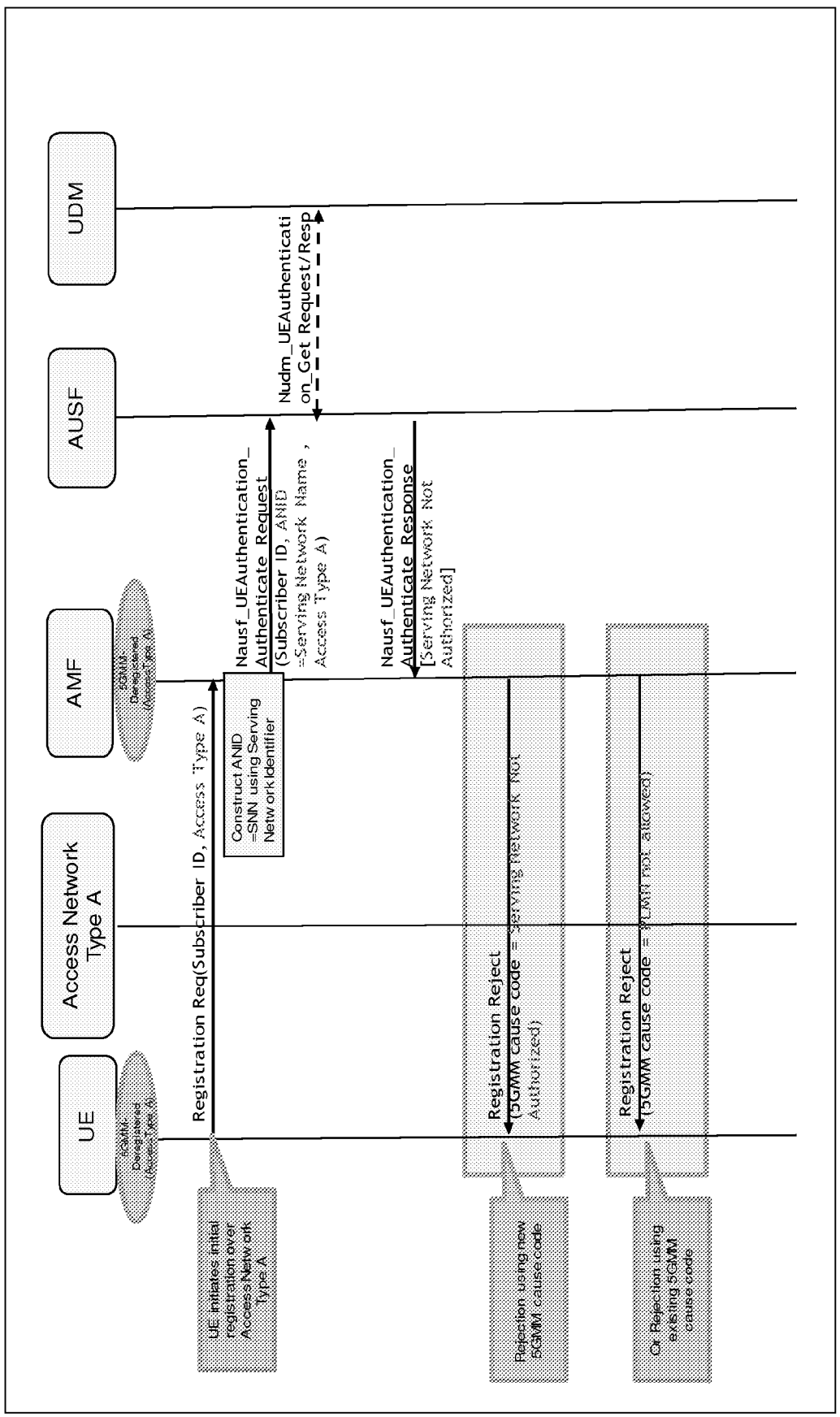
FIG. 13 illustrates a logical flow diagram of an embodiment of a method for registration by a UE over an access network type A when a serving network authorization failure has occurred, in accordance with some embodiments described herein.

FIG. 13 illustrates a logical flow diagram of an embodiment of a method for registration by a UE over an access network type A when a serving network authorization failure has occurred. Note that NAS messages between the UE and AMF are tunneled via IPsec tunnel in case the Access Network Type A is an untrusted non-3GPP access.

Upon receiving the Nausf_UEAuthentication_Authenticate Request message, the AUSF compares the received serving network name with the expected serving network name. If the requesting SEAF in the serving network is not authorized to use the serving network name, the AUSF responds with "serving network not authorized" in the Nausf_UEAuthentication_Authenticate Response.

The serving network authorization failure is different from other PLMN related failures. It is not failure due to UE subscription or access restriction, e.g. due to operator barring, rather it is due to the serving network failure of security verification/authorization. Currently there is no cause code for such a failure case.

One failure code related to PLMN failure is "PLMN not allowed", but it is for indicating to the UE a rejection due to subscription or due to operator determined barring. This failure code is: Cause #11—PLMN not allowed. This 5GMM cause is sent to the UE if it requests service, or if the network initiates a de-registration request, in a PLMN where the UE, by subscription or due to operator determined barring, is not allowed to operate.

When the UE receives a rejection due to "PLMN not allowed", the UE needs to set the 5GS update status to 5U3 ROAMING NOT ALLOWED, reset the registration attempt counter, delete its security context, any 5G-GUTI, last visited registered TAI, TAI list, ngKSI, the list of equivalent PLMNs and also store the PLMN identity in the "forbidden PLMN list".

However, when the serving network authorization failure occurs, given that the failure is not failure related to UE subscription or access restriction, the UE does not need to reset its update status to 5U3 ROAMING NOT ALLOWED and could immediately attempt to select another PLMN. So, it is more appropriate to define a new cause code for this different situation since the UE may take different actions.

For example, when the serving network authorization failure occurs, the UE may abort the initial registration procedure with the PLMN, store the PLMN identity in the "forbidden PLMN list", set the 5GS update status to 5U2 NOT UPDATED and enter state 5GMM-DEREGISTERED.PLMN-SEARCH in order to perform a PLMN selection. As such, a new 5GMM rejection cause is needed to indicate "Serving Network Not Authorized".

Figures 14, 15:
FIG. 14 illustrates a schematic block diagram of an embodiment of 5GMM cause information element, in accordance with some embodiments described herein.
FIG. 15 illustrates a schematic block diagram of an embodiment of cause values for the 5GMM cause information element, in accordance with some embodiments described herein.

FIG. 14 illustrates a schematic block diagram of an embodiment of 5GMM cause information element. The 5GMM cause information element indicates a reason for a rejection by the network of a 5GMM request from the UE. A new 5GMM rejection cause is included in this information element to indicate "Serving Network Not Authorized". For example, the new rejection may be included as new cause code #73 to signal a serving network authorization failure to the UE. The new cause code is used if the authentication process cannot proceed because the serving network is not authorized.

FIG. 15 illustrates a schematic block diagram of an embodiment of cause values for the 5GMM cause information element. The cause values are updated to include new Cause #73—Serving Network Not Authorized. This 5GMM cause is sent to the UE if the UE initiates registration towards a serving network and the serving network failed authorization.

After failure of authentication of the serving network, the UE receives a registration rejection with 5GMM cause "Serving Network Not Authorized" for 3GPP access. The UE then aborts the initial registration procedure, stores the PLMN identity in the "forbidden PLMN list", sets the 5GS update status to 5U2 NOT UPDATED and enters state 5GMM-DEREGISTERED.PLMN-SEARCH in order to perform a PLMN selection. The UE is thus able to select another PLMN.

3. Embodiment—Methods and Protocol Enhancements to Support Using NAI as One Type of Subscription Identifier and Future Extensibility of Subscription Identifier for Support of MuLteFire and Private Networks a) A New Field "SUPI Format" is Defined to Enable Different Subscriber Identity Type/Formats to be Used as the Subscriber Identifier A globally unique 5G Subscription Permanent Identifier (SUPI) is allocated to each subscriber in the 5G System and provisioned in the UDM/UDR. The SUPI is used only inside the 3GPP system, and its privacy is specified in 3GPP TS 33.501, "Security architecture and procedures for 5G System," Release 15 dated Mar. 26, 2018 and incorporated by reference herein. The following have been identified as valid SUPI types: IMSI and NAI.

The SUCI is a partially encrypted SUPI used during procedures associated with the 5G System when the device has not been assigned a 5G-GUTI (5G Globally Unique Temporary Identity). The SUCI is generally created by encrypting the MSIN (Mobile Subscriber Identification Number) component of the subscriber's IMSI.

The UE generates a SUCI using the raw public key that was securely provisioned in control of the home network. The protection scheme uses the raw public key of the home network. The UE constructs a scheme-input from the subscription identifier part of the SUPI, as specified by the protection scheme (e.g., applying some padding-scheme). The UE then executes the protection scheme with the constructed scheme-input as input and take the output as the scheme-output. The UE does not conceal the home network identifier, e.g., Mobile Country Code (MCC) or Mobile Network Code (MNC). The UE then generates the SUCI including the home network identifier, the identifier of the home network public key, and the scheme-output.

However, given that both IMSI and NAI formats can be used for SUPI, for SUCI schema output, MSIN corresponds to the representation in case the subscription identifier is in IMSI format and username corresponds to the representation in case the subscription identifier is in NAI format. For IMSI based NAI, the subscriber identifier part of NAI is also made of digits, so additional encoding rules are needed to distinguish the IMSI format, NAI format and potentially other types of subscriber identifier formats within the SUCI information element definition.

FIG. 16 illustrates a schematic block diagram of an embodiment of a new information field for a Subscription Concealed Identifier (SUCI) to enable different SUCI structures. Using a new information field, the mobile identify format for the SUPI and SUCI may be tailored based on the SUPI identity type/format used. For example, for IMSI, the network identifier is based on MNC/MCC. For IMSI based NAI, the network identifier is also based on MNC/MCC. For non-IMSI based NAI, the network identifier is based on a generic network type indicator and operator or enterprise specific network identifier, where the network type indicator can be based on a special reserved/hard-coded global MCC/MNC value. For MuLteFire NAI (MF-NAI), the network identifier is based on special reserved/hard-coded global MCC/MNC, Neutral Host Network ID (NHN-ID), and Participating service provider ID (PSP-ID).

FIG. 17 illustrates a schematic block diagram of an embodiment of identity types supported by the new information field for the Subscription Concealed Identifier (SUCI). The new SUCI information field enables different identity types for the Subscriber Identifier. The identity types may include SUCI, 5G-GUTI, IMEI, 5G-S-TMSI, IMEISV, MAC address, or a device identify. The device identity may include for example, UDI, ODIN, Bluetooth id, serial number, etc. Alternate or additional identity types may also be defined.

Figure 18:
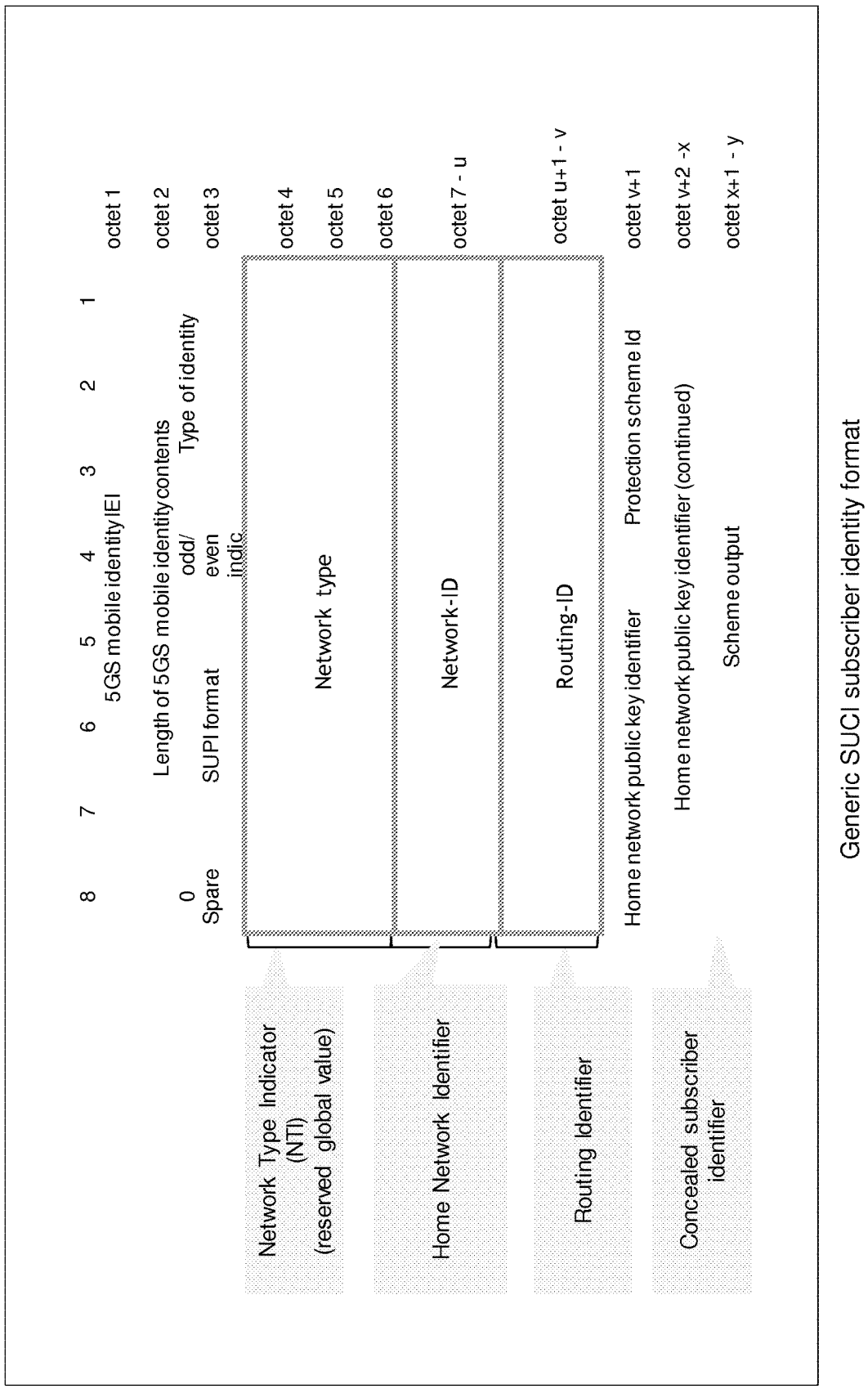
FIG. 18 illustrates a schematic block diagram of an embodiment of a generic SUCI subscriber identity format, in accordance with some embodiments described herein.

FIG. 18 illustrates a schematic block diagram of an embodiment of a generic SUCI subscriber identity format. The SUCI subscriber identity structure includes a network type indicator (NTI). A home network identifier and the routing identifier may be different for different access network types. The scheme output field contains the concealed subscriber identifier generated using a protection scheme.

Figure 19:
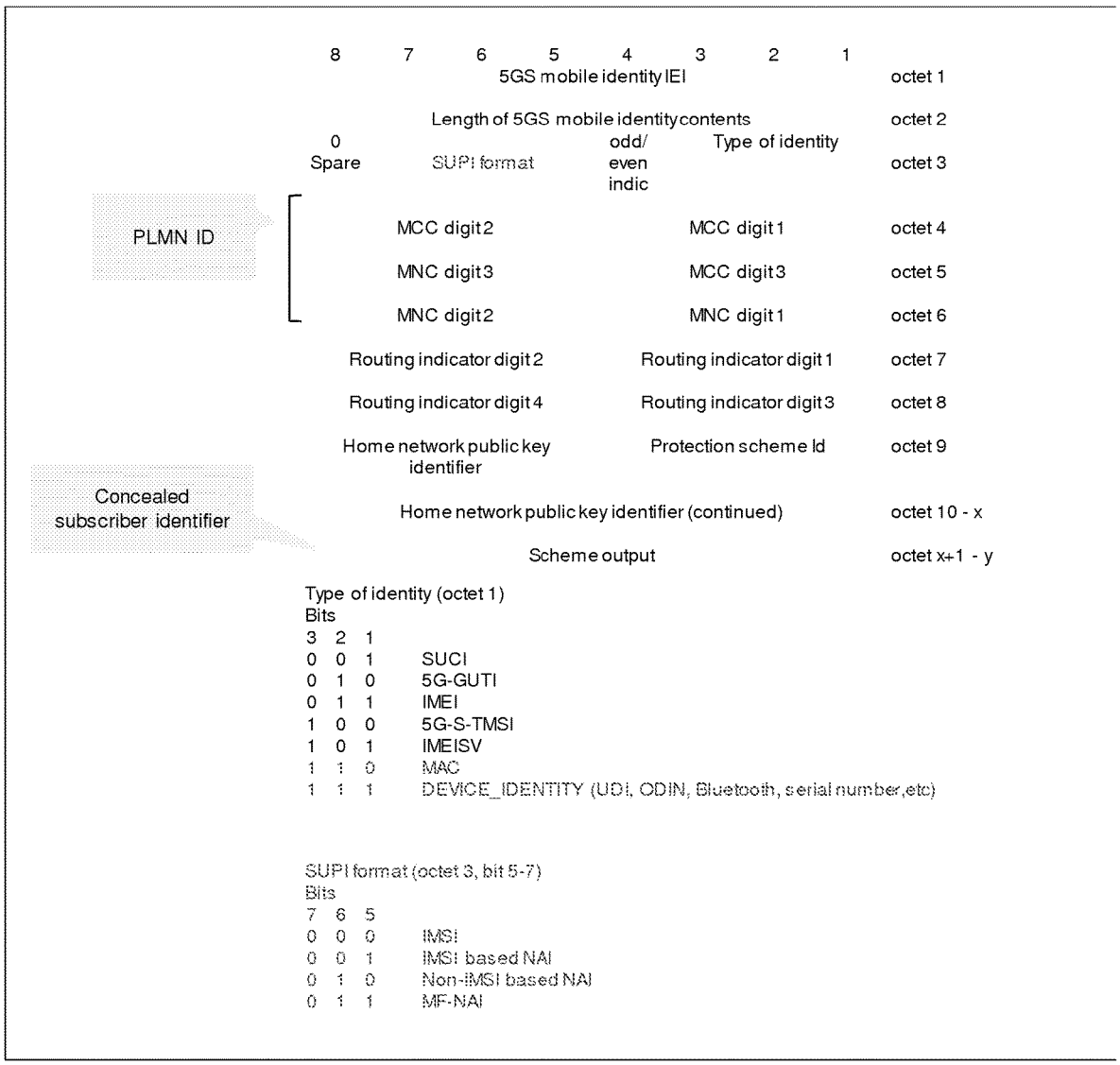
FIG. 19 illustrates a schematic block diagram of an embodiment of a SUCI subscriber identity format when the SUPI format is IMSI or IMSI based NAI, in accordance with some embodiments described herein.

FIG. 19 illustrates a schematic block diagram of an embodiment of a SUCI subscriber identity format when the SUPI format is IMSI or IMSI based NAI. This illustrates the 5GS mobile identity information element format when type of identity is "SUCI" and SUPI format is "IMSI" or "IMSI based NAI". For 3GPP access network, the home network identifier contains the PLMN ID (MCC and MNC). The Mobile Country Code (MCC) and Mobile Network Code (MNC) may be part of the routing information.

Figure 20:
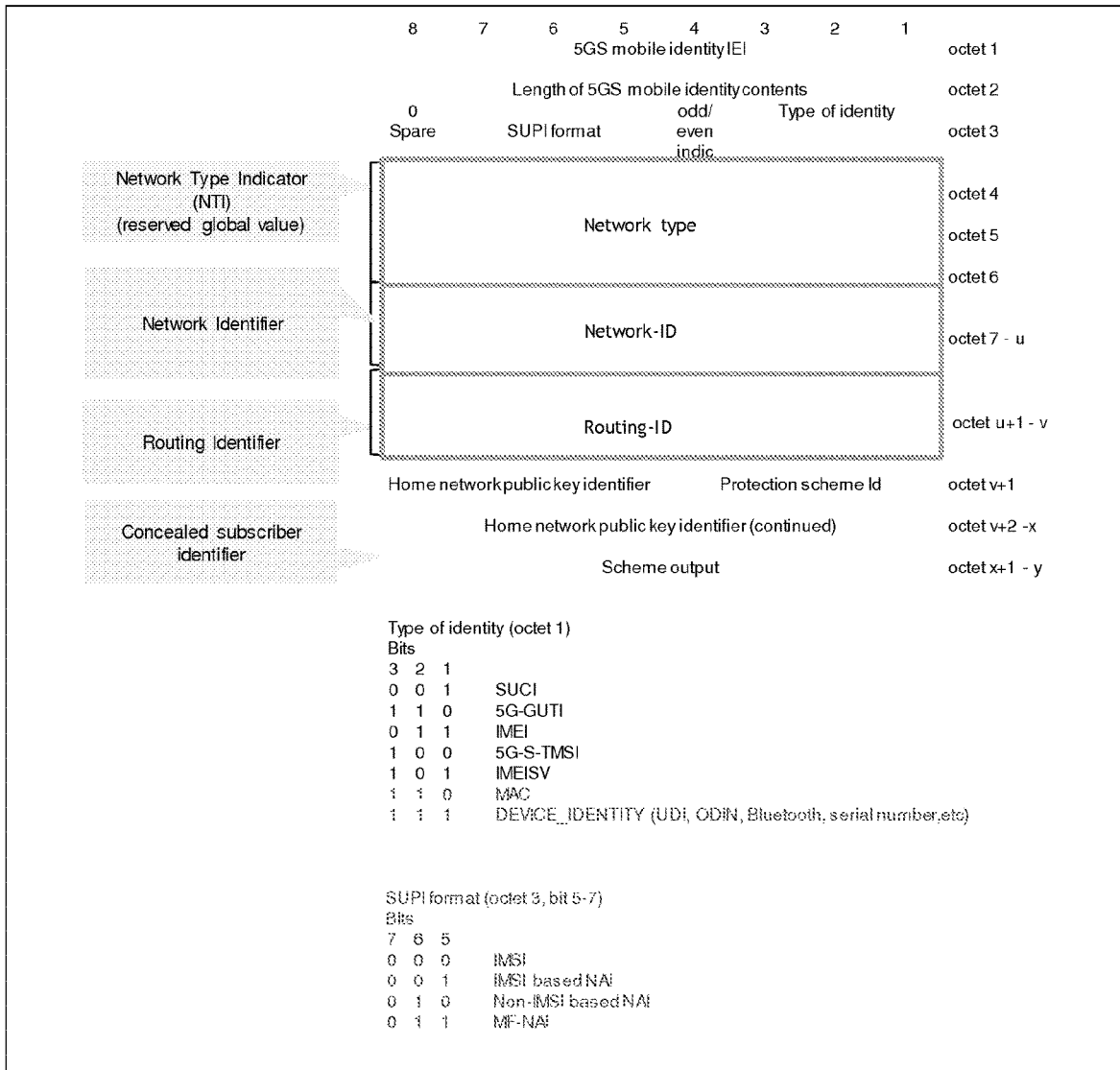
FIG. 20 illustrates a schematic block diagram of an embodiment of a SUCI subscriber identity format when the SUPI format is Non-IMSI based NAI and the type of identity is "SUCI", in accordance with some embodiments described herein.

FIG. 20 illustrates a schematic block diagram of an embodiment of a SUCI subscriber identity format when the SUPI format is Non-IMSI based NAI and the type of identity is "SUCI". This illustrates an example of the 5GS mobile identity information element format when the type of identity is "SUCI" and the SUPI format is "non-IMSI based NAI". The network identifier and routing information are network specific. The values in the Network Type Indicator (NTI) field are used to indicate the type of network.

Figure 21:
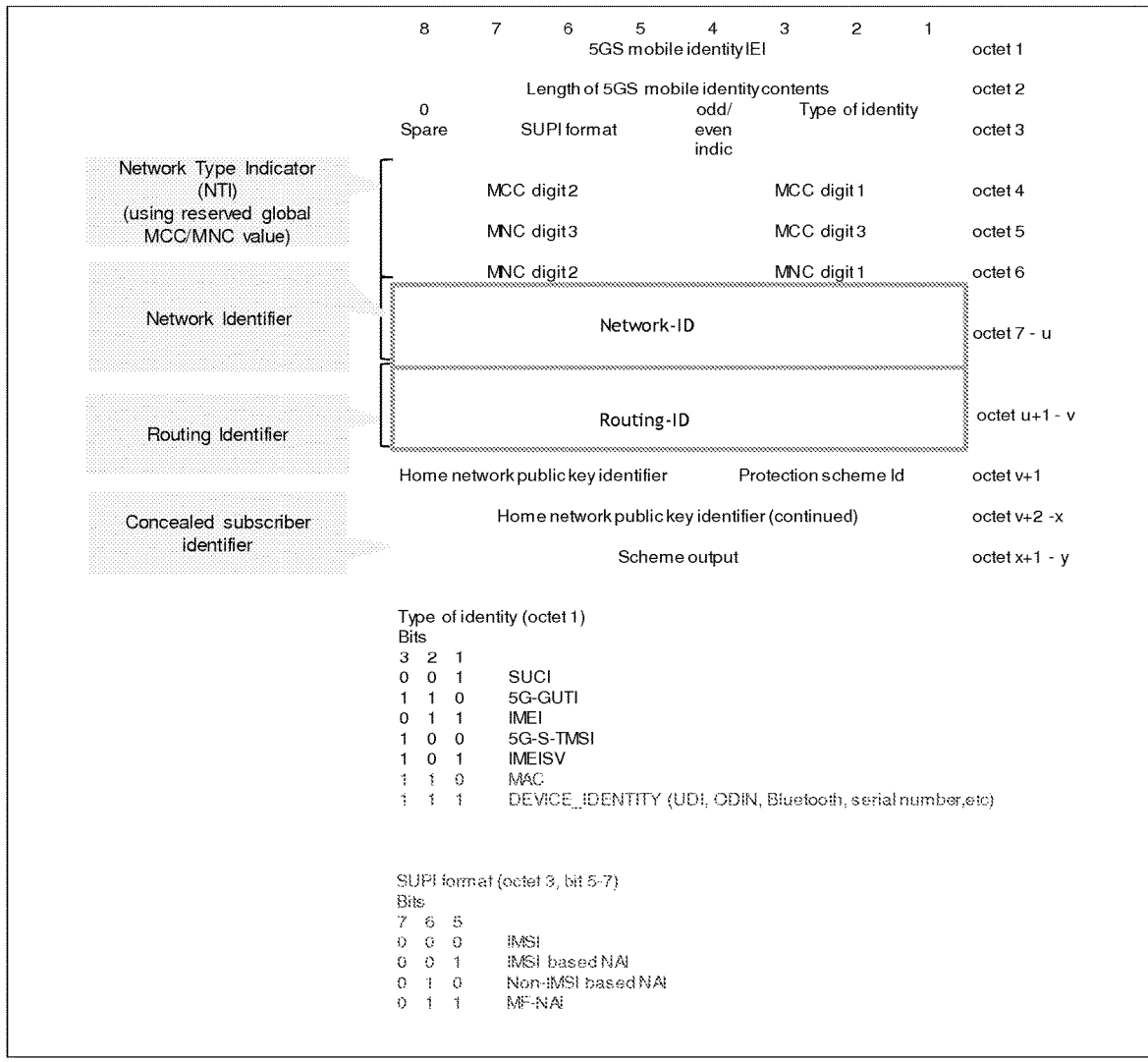
FIG. 21 illustrates a schematic block diagram of an embodiment of a SUCI subscriber identity format when the SUPI format is Non-IMSI based NAI" and the NTI is assigned a reserved global PLMN ID, in accordance with some embodiments described herein.

FIG. 21 illustrates a schematic block diagram of an embodiment of a SUCI subscriber identity format when the SUPI format is Non-IMSI based NAI" and the NTI is assigned a reserved global PLMN ID. When the SUPI format is "Non-IMSI based NAI", the Network Type Indicator may be a reserved global value in PLMN ID (MCC/MNC).

Figure 22:
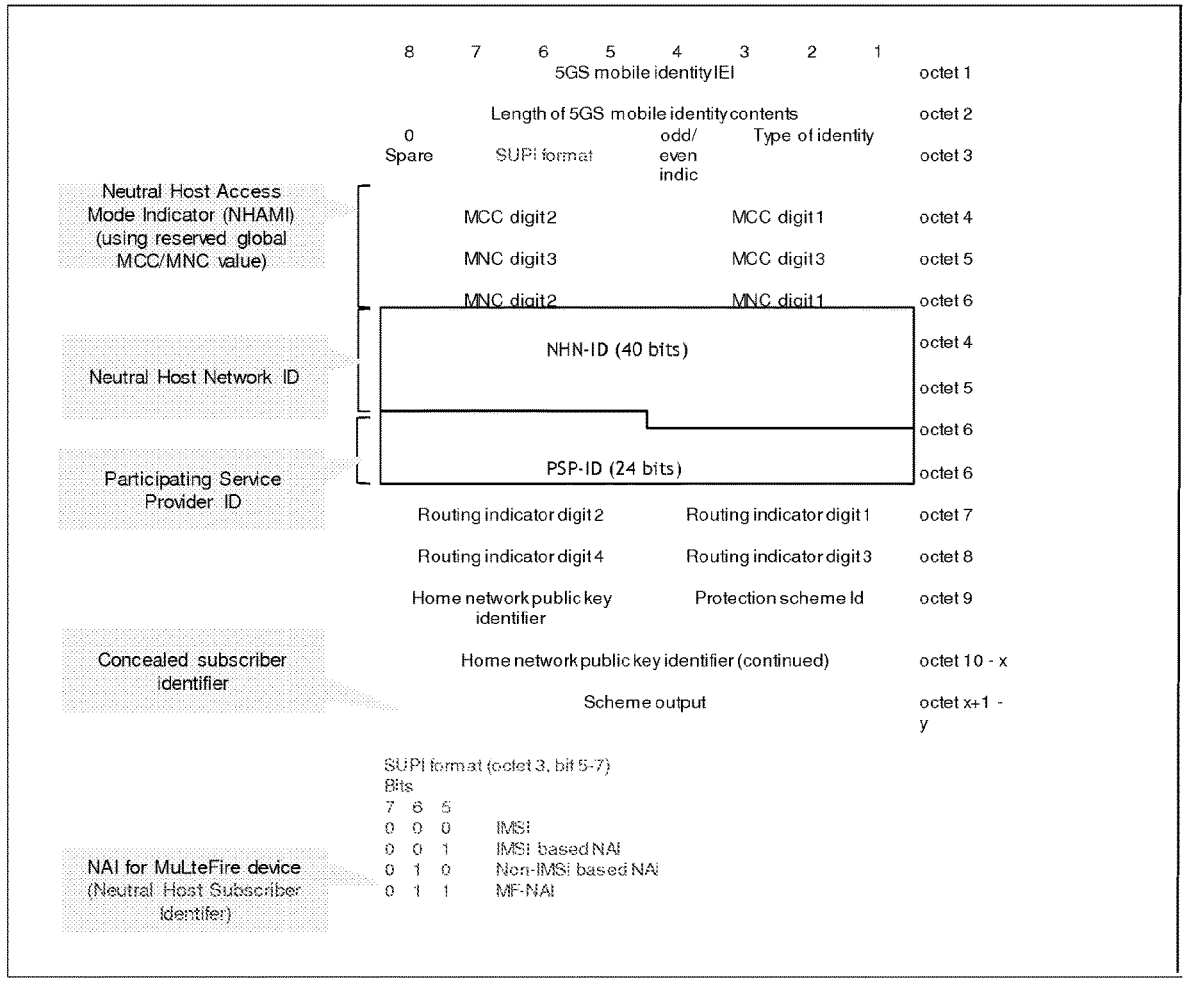
FIG. 22 illustrates a schematic block diagram of an embodiment of a SUCI subscriber identity format when the type of identity is "SUCI" and the SUPI format is "MF-NAI", in accordance with some embodiments described herein.

FIG. 22 illustrates a schematic block diagram of an embodiment of a SUCI subscriber identity format when the type of identity is "SUCI" and the SUPI format is "MF-NAI". For MuLteFire networks, the network identifier and routing information are based on a Neutral Host Network ID (NHN-ID), Participating Service Provider ID (PSP-ID) and Neutral Host Access Mode Indicator (NHAMI). NHAMI is a reserved global value that is the same for all MuLteFire networks enabling NHN Access Mode.

FIG. 23 illustrates a schematic block diagram of an embodiment of the SUCI identity type. The table illustrates various examples of additional encoding for the SUCI identity type.

Figure 24:
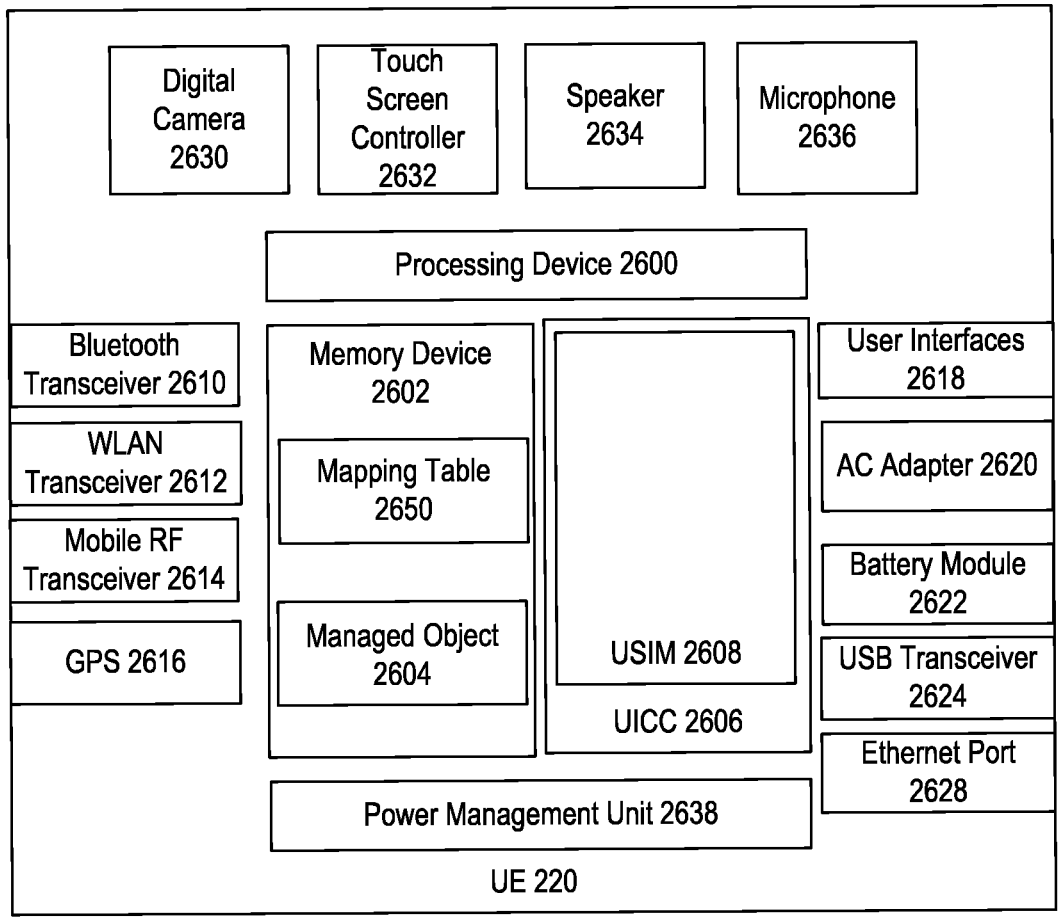
FIG. 24 illustrates a schematic block diagram of an embodiment of example user equipment, in accordance with some embodiments described herein.

FIG. 24 illustrates a schematic block diagram of an embodiment of example user equipment 220. The user equipment (UE) 220 may include a smart phone, smart tablet, laptop, smart watch, PC, TV or other device. Additional or alternative components and functions may be included within the UE 220. In addition, one or more of the functions and components shown herein may not be present or combined with other components or functions.

The UE 220 includes a processing device 2600 and memory device 2602 that are configured to perform one or more of the functions described herein with respect to the UE 220. The memory device 2602 may include a managed object 2604 that stores applications and operational instructions that controls the processing device 2600 to perform various functions described herein. The memory device 2602 may also store the Serving Network and Access Type to NAS connections mapping table 2650. The UE 220 may also include a UICC 2606 that includes a USIM 2608 for storage of the IMSI.

The UE 220 may further include a Bluetooth transceiver 2610, a WLAN (IEEE 802.11x compliant) transceiver 2612, mobile RF (3G/4G/5G) transceiver 2614 and GPS 2616. The WLAN transceiver 2612 may operate as a non-3GPP access interface to a WLAN network. The UE 220 may further include user interfaces 2618, AC adapter 2620, battery module 2622, USB transceiver 2624 and Ethernet Port 2628.

The UE 220 may further include a digital camera 2630, touch screen controller 2632, speaker 2634 and microphone 2636. The UE 220 may also include a power management unit 2638. One or more internal communication buses (not shown) may communicatively couple one or more of the components of the UE 220.

Figure 25:
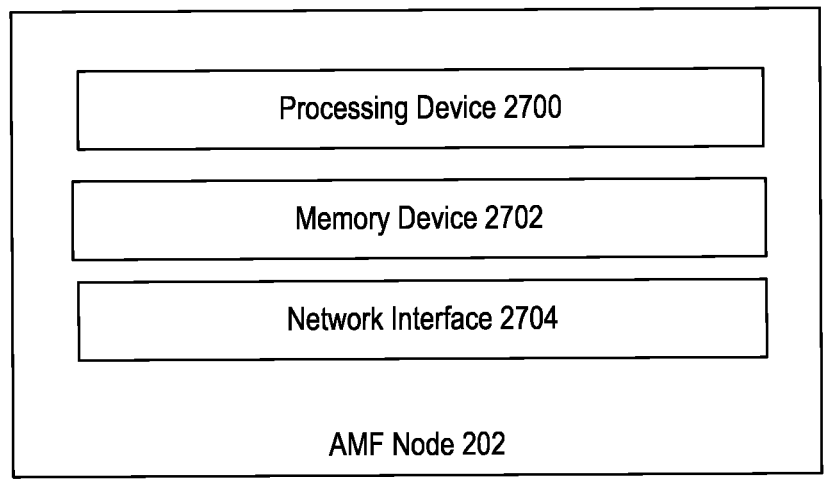
FIG. 25 illustrates a schematic block diagram of an embodiment of an example AMF Node, in accordance with some embodiments described herein.

FIG. 25 illustrates a schematic block diagram of an embodiment of an example AMF Node. The AMF node may be integrated with other nodes in the 5G core network. Additional or alternative components and functions may be included within the AMF node. In addition, one or more of the functions and components shown herein may not be present or combined with other components or functions or nodes. The AMF node includes a processing device 2700 and memory device 2702 that are configured to perform one or more of the functions described herein. The AMF node may include a network interface 2704 that includes ports for interfacing to other network nodes in the 5GC network.

Figure 26:
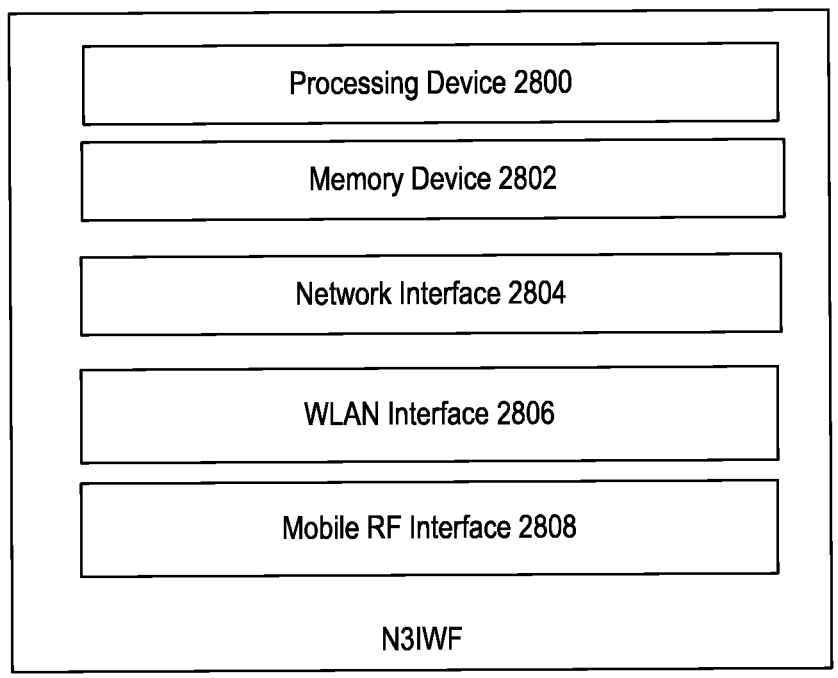
FIG. 26 illustrates a schematic block diagram of an embodiment of an example N3IWF, in accordance with some embodiments described herein.

FIG. 26 illustrates a schematic block diagram of an embodiment of an example N3IWF. The N3IWF may be an access point in a wireless local area network, a gateway in a local area network, etc. The N3IWF may be integrated with other nodes in an access network. Additional or alternative components and functions may be included within the N3IWF. In addition, one or more of the functions and components shown herein may not be present or combined with other components or functions. The N3IWF includes a processing device 2800 and memory device 2802 that are configured to perform one or more of the functions described herein. The N3IWF may include a first network interface 2804 (e.g. Ethernet ports, IP ports) for interfacing to other network nodes in the 5GC network. The N3IWF may also include one or more other types of interfaces to communicate with the UE, such as a WLAN transceiver 2806 (e.g., compliant with IEEE 802.1x WLAN type networks). The N3IWF may also include a mobile RF transceiver 2808 compliant with a cellular air interface. The UE 220 may communicate with the N3IWF using one or more of the WLAN transceiver 2806 or Mobile RF transceiver 2808.

A processing device as described herein includes at least one processing device, such as a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory may be a single memory device or a plurality of memory devices. The memory device may be a read-only memory, random access memory, volatile memory, non-volatile memory, static memory, dynamic memory, flash memory, cache memory, and/or any non-transitory memory device that stores digital information. The term "module" is used in the description of one or more of the embodiments of elements herein. A module includes one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A user equipment (UE) comprising:
at least one processor; and
at least one memory storing instructions thereon that, when executed by the at least one processor, cause the UE to perform at least:
determining a subscription permanent identifier (SUPI) format of a SUPI from among a plurality of SUPI formats, the plurality of SUPI formats comprising an international mobile subscriber identity (IMSI) type and a network specific identifier (NSI) type;
constructing a subscription concealed identifier (SUCI) operable to be used to identify the UE during communication with a core network via a selected type of access network, the selected type of access network being a third-generation partnership project (3GPP) access network type or a non-3GPP access network type, the SUCI including at least:
a SUPI format value corresponding to the SUPI format of the SUPI,
a home network identifier associated with a home network of the UE, a home network identifier format of the home network identifier being dependent upon the SUPI format of the SUPI,
a routing indicator associated with the home network of the UE,
a protection scheme identifier corresponding to a protection scheme of a plurality of protection schemes,
a home network public key identifier associated with a public key generated by the home network of the UE, and
a scheme output, the scheme output being determined from the SUPI using the protection scheme, wherein a scheme output format of the scheme output is dependent on the protection scheme;

in an instance in which the SUPI format of the SUPI is the IMSI type, setting the SUPI format value to a first value to indicate the SUPI format of the SUPI is the IMSI type;

in an instance in which the SUPI format of the SUPI is the NSI type, setting the SUPI format value to a second value to indicate the SUPI format of the SUPI is the NSI type; and communicating with a network node of the core network via the selected type of access network using the SUCI.

2. The UE of claim 1, wherein the SUCI is transmitted to the network node of the core network as a mobile identity parameter with a type of identity field indicating a SUCI identity type.

3. The UE of claim 2, wherein the mobile identity parameter comprises a fifth-generation system (5GS) mobile identity parameter.

4. The UE of claim 3, wherein the SUPI format value of the SUCI is encoded in a SUPI format field of the 5GS mobile identity parameter.

5. The UE of claim 1, wherein the selected access network comprises one of: a trusted non-3GPP access network or an untrusted non-3GPP access network.

6. The UE of claim 5, wherein the selected access network comprises an untrusted non-3GPP access network.

7. The UE of claim 1, wherein the core network comprises a fifth-generation core network (5GCN).

8. The UE of claim 1, wherein the SUPI comprises a network specific indicator (NAI) indicating that the SUPI format of the SUPI is the NSI type.

9. A network node comprising:
at least one processor; and
at least one memory storing instructions thereon that, when executed by the at least one processor, cause the network node to perform at least:
  receiving, from a user equipment (UE), via a selected type of access network, a subscription concealed identifier (SUCI), the selected type of access network being a third-generation partnership project (3GPP) access network type or a non-3GPP access network type, the SUCI including at least:
    a subscription permanent identifier (SUPI) format value corresponding to a SUPI format of a SUPI, the SUPI format being one of a plurality of SUPI formats, the plurality of SUPI formats comprising an international mobile subscriber identity (IMSI) type and a network specific identifier (NSI) type,
    a home network identifier associated with a home network of the UE, a home network identifier format of the home network identifier being dependent upon the SUPI format of the SUPI,
    a routing indicator associated with the home network of the UE,
    a protection scheme identifier corresponding to a protection scheme of a plurality of protection schemes,
    a home network public key identifier associated with a public key generated by the home network of the UE, and
    a scheme output, the scheme output being determined from the SUPI using the protection scheme, wherein a scheme output format of the scheme output is dependent on the protection scheme;
  determining, based on the SUPI format value being set to a first value, that the SUPI format of the SUPI is the IMSI type;
  determining, based on the SUPI format value being set to a second value, that the SUPI format of the SUPI is the NSI type; and
  identifying the UE, during communication with the UE via the selected type of access network, based at least on the SUCI.

10. The network node of claim 9, wherein the SUCI is received by the network node as a mobile identity parameter with a type of identity field indicating a SUCI identity type.

11. The network node of claim 10, wherein the mobile identity parameter comprises a fifth-generation system (5GS) mobile identity parameter.

12. The network node of claim 11, wherein the SUCI format value of the SUCI is encoded in a SUPI format field of the 5GS mobile identity parameter.

13. The network node of claim 9, wherein the selected access network comprises one of: a trusted non-3GPP access network or an untrusted non-3GPP access network.

14. The network node of claim 13, wherein the selected access network comprises an untrusted non-3GPP access network.

15. The network node of claim 9, wherein the core network comprises a fifth-generation core network (5GCN).

16. The network node of claim 9, wherein the SUPI comprises a network specific indicator (NAI) indicating that the SUPI format of the SUPI is the NSI type.

17. The apparatus of claim 9, wherein the SUCI is constructed in a network access identifier (NAI) format.

18. A method comprising:
  determining a subscription permanent identifier (SUPI) format of a SUPI from among a plurality of SUPI formats, the SUPI being associated with a user equipment (UE), the plurality of SUPI formats comprising an international mobile subscriber identity (IMSI) type and a network specific identifier (NSI) type;
  constructing, at the UE, a subscription concealed identifier (SUCI) operable to be used to identify the UE user equipment during communication with a core network via a selected type of access network, the selected type of access network being a third-generation partnership project (3GPP) access network type or a non-3GPP access network type, the SUCI including at least:
    a SUPI format value corresponding to a SUPI format of the SUPI,
    a home network identifier associated with a home network of the UE, a home network identifier format of the home network identifier being dependent upon the SUPI format of the SUPI,
    a routing indicator associated with the home network of the UE,
    a protection scheme identifier corresponding to a protection scheme of a plurality of protection schemes,
    a home network public key identifier associated with a public key generated by the home network of the UE, and
    a scheme output, the scheme output being determined from the SUPI using the protection scheme, wherein a scheme output format of the scheme output is dependent on the protection scheme;
  in an instance in which the SUPI format of the SUPI is the IMSI type, setting the SUPI format value to a first value to indicate the SUPI format of the SUPI is the IMSI type;
  in an instance in which the SUPI format of the SUPI is the NSI type, setting the SUPI format value to a second value to indicate the SUPI format of the SUPI is the NSI type; and communicating with a network node of the core network via the selected type of access network using the SUCI.

19. A method comprising:

receiving, from a user equipment (UE), via a selected type of access network, a subscription concealed identifier (SUCI), the selected type of access network being a third-generation partnership project (3GPP) access network type or a non-3GPP access network type, the SUCI including at least:
   a subscription permanent identifier (SUPI) format value corresponding to a SUPI format of a SUPI, the SUPI format being one of a plurality of SUPI formats, the plurality of SUPI formats comprising an international mobile subscriber identity (IMSI) type and a network specific identifier (NSI) type,
   a home network identifier associated with a home network of the UE, a home network identifier format of the home network identifier being dependent upon the SUPI format of the SUPI,
   a routing indicator associated with the home network of the UE,
   a protection scheme identifier corresponding to a protection scheme of a plurality of protection schemes,
   a home network public key identifier associated with a public key generated by the home network of the UE, and
   a scheme output, the scheme output being determined from the SUPI using the protection scheme, wherein a scheme output format of the scheme output is dependent on the protection scheme;

determining, based on the SUPI format value in the SUCI being set to a first value, that the SUPI format of the SUPI is the IMSI type;

determining, based on the SUPI format value in the SUCI being set to a second value, that the SUPI format of the SUPI is the NSI type; and identifying the UE, during communication with the UE via the selected type of access network, based at least on the SUCI.

20. A non-transitory computer readable storage medium having instructions embodied thereon that, when executed by one or more processors of a user equipment (UE), cause the UE to perform at least the following:

determining a subscription permanent identifier (SUPI) format of a SUPI from among a plurality of SUPI formats, the SUPI being associated with the UE, the plurality of SUPI formats comprising an international mobile subscriber identity (IMSI) type and a network specific identifier (NSI) type;

constructing, using the UE, a subscription concealed identifier (SUCI) operable to be used to identify the UE during communication with a core network via a selected type of access network, the selected type of access network being a third-generation partnership project (3GPP) access network type or a non-3GPP access network type, the SUCI being calculated at least based on the SUPI and the SUPI format of the SUPI, the SUCI including at least:
   a SUPI format value corresponding to a SUPI format of the SUPI,
   a home network identifier associated with a home network of the UE, a home network identifier format of the home network identifier being dependent upon the SUPI format of the SUPI,
   a routing indicator associated with the home network of the UE,
   a protection scheme identifier corresponding to a protection scheme of a plurality of protection schemes,
   a home network public key identifier associated with a public key generated by the home network of the UE, and
   a scheme output, the scheme output being determined from the SUPI using the protection scheme, wherein a scheme output format of the scheme output is dependent on the protection scheme;

in an instance in which the SUPI format of the SUPI is the IMSI type, setting the SUPI format value to a first value to indicate the SUPI format of the SUPI is the IMSI type;

in an instance in which the SUPI format of the SUPI is the NSI type, setting the SUPI format value to a second value to indicate the SUPI format of the SUPI is the NSI type; and communicating with a network node of the core network via the selected type of access network using the SUCI.

21. A non-transitory computer readable storage medium having instructions embodied thereon that, when executed by one or more processors of an apparatus, cause the apparatus to perform at least the following:

receiving, from a user equipment (UE), via a selected type of access network, a subscription concealed identifier (SUCI), the selected type of access network being a third-generation partnership project (3GPP) access network type or a non-3GPP access network type, the SUCI including at least:
   a subscription permanent identifier (SUPI) format value corresponding to a SUPI format of a SUPI, the SUPI format being one of a plurality of SUPI formats, the plurality of SUPI formats comprising an international mobile subscriber identity (IMSI) type and a network specific identifier (NSI) type,
   a home network identifier associated with a home network of the UE, a home network identifier format of the home network identifier being dependent upon the SUPI format of the SUPI,
   a routing indicator associated with the home network of the UE,
   a protection scheme identifier corresponding to a protection scheme of a plurality of protection schemes,
   a home network public key identifier associated with a public key generated by the home network of the UE, and
   a scheme output, the scheme output being determined from the SUPI using the protection scheme, wherein a scheme output format of the scheme output is dependent on the protection scheme;

determining, based on the SUPI format value in the SUCI being set to a first value, that the SUPI format of the SUPI is the IMSI type;

determining, based on the SUPI format value in the SUCI being set to a second value, that the SUPI format of the SUPI is the NSI type; and identifying the UE, during communication with the UE via the selected type of access network, based at least on the SUCI.

\* \* \* \* \*

UNITED STATES PATENT AND TRADEMARK OFFICE
CERTIFICATE OF CORRECTION

PATENT NO. : 12,231,876 B2
APPLICATION NO. : 17/266295
DATED : February 18, 2025
INVENTOR(S) : Jennifer Liu Page 1 of 1

It is certified that error appears in the above-identified patent and that said Letters Patent is hereby corrected as shown below:

In the Claims

In Column 23, Line 30, Claim 8, delete "network specific indicator (NAI)" and insert -- network specific indicator (NSI) --, therefor.

In Column 24, Line 25, Claim 16, delete "network specific indicator (NAI)" and insert -- network specific indicator (NSI) --, therefor.

In Column 24, Line 27, Claim 17, delete "apparatus" and insert -- network node --, therefor.

In Column 24, Lines 37-38, Claim 18, delete "UE user equipment" and insert -- UE --, therefor.

Signed and Sealed this
Twenty-ninth Day of April, 2025

Coke Morgan Stewart
*Acting Director of the United States Patent and Trademark Office*